US009699504B2

(12) United States Patent
Maughan

(10) Patent No.: US 9,699,504 B2
(45) Date of Patent: *Jul. 4, 2017

(54) SYSTEMS AND METHODS FOR IDENTIFYING A SOURCE OF MEDIA CONTENT BASED ON A LOG OF CONTENT IDENTIFIERS

(71) Applicant: Rovi Guides, Inc., Santa Clara, CA (US)

(72) Inventor: Benjamin H. Maughan, Pleasanton, CA (US)

(73) Assignee: Rovi Guides, Inc., San Carlos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/867,664

(22) Filed: Sep. 28, 2015

(65) Prior Publication Data
US 2017/0094349 A1 Mar. 30, 2017

(51) Int. Cl.
*H04H 60/32* (2008.01)
*H04N 21/442* (2011.01)
*H04N 21/24* (2011.01)

(52) U.S. Cl.
CPC ... *H04N 21/44204* (2013.01); *H04N 21/2407* (2013.01)

(58) Field of Classification Search
CPC ........... H04N 21/44008; H04N 21/442; H04N 21/4532; H04N 21/4667; H04N 21/478
USPC .......................................................... 725/14
See application file for complete search history.

(56) References Cited

U.S. PATENT DOCUMENTS

| 7,738,704 | B2 | 6/2010 | Lienhart et al. |
| 8,700,641 | B2* | 4/2014 | Covell .............. G06F 17/30743 707/722 |
| 8,996,810 | B2* | 3/2015 | Liang .................. G06F 12/0806 711/119 |
| 2005/0177847 | A1 | 8/2005 | Konig et al. |
| 2007/0124756 | A1* | 5/2007 | Covell .............. G06F 17/30743 725/18 |
| 2007/0143777 | A1 | 6/2007 | Wang |
| 2009/0049465 | A1* | 2/2009 | Deng ..................... H04H 60/31 725/9 |
| 2013/0202150 | A1* | 8/2013 | Sinha .................... G06T 1/0021 382/100 |

(Continued)

*Primary Examiner* — Michael B Pierorazio
(74) *Attorney, Agent, or Firm* — Ropes & Gray LLP

(57) ABSTRACT

Systems and methods are described for identifying a content source of media content being transmitted to a viewer in situations when a specific media asset is being transmitted to the viewer from two different content sources nearly simultaneously. For example, if a certain movie is being broadcast at nearly the same time by two different channels, the system is able to identify the channel that the viewer is watching. The system performs the identification by obtaining content identifiers for two different channels, matching the content identifier based on time and then finding a divergent pair of content identifiers by iterating in reverse chronological order through the pairs and comparing the content identifiers. The system then compares the content identifiers to content identifiers in a log that stores content identifiers and timestamps for content that the viewer is consuming. The matching content identifier corresponds to the correct content source.

20 Claims, 10 Drawing Sheets

(56) References Cited

U.S. PATENT DOCUMENTS

2014/0230002 A1* 8/2014 Kitazato ............ H04N 21/4383
              725/109
2014/0282668 A1* 9/2014 Gava ................ H04N 21/44213
              725/19

* cited by examiner

500

502 — Begin routine to determine whether the first content source or the second content source is a source of content that the user is presently consuming based on whether the first content identifier from the first plurality of content identifiers or the second content identifier from the second plurality of content identifiers matches the contemporaneous content identifier from the log

504 — Retrieve the first content identifier from memory

506 — Compare the first content identifier to a contemporaneous content identifier stored in a log

508 — Does the first content identifier match the contemporaneous content identifier?

Yes → 510 — Execute subroutine to indicate that the first content source is the content source that the viewer is consuming content from

No ↓

512 — Compare the second content identifier to a contemporaneous content identifier stored in a log

514 — Does the second content identifier match the contemporaneous content identifier?

Yes → 516 — Execute subroutine to indicate that the second content source is the content source that the viewer is consuming content from

No ↓

518 — Execute subroutine to indicate that content source identification has failed.

FIG. 5

600 ...
601 Initialization Subroutine
602 ...
603 //Routine to determine whether the first content source or the second content source is a source of content that the user is presently consuming based on whether the first content identifier from the first plurality of content identifiers or the second content identifier from the second plurality of content identifiers matches the contemporaneous content identifier from the log:
604
605 Receive the first content identifier
606 Receive the second content identifier
607 Receive the contemporaneous content identifier
608 If (the first content identifier=the contemporary content identifier)
609     Execute Subroutine to indicate that the first content source is the content source that the viewer is consuming using control circuitry
610 Else If (the second content identifier=the contemporary content identifier)
611     Execute Subroutine to indicate that the second content source is the content source that the viewer is consuming using control circuitry
612 Else
613     Execute Subroutine to indicate that the content source identification failed using control circuitry
614 ...
615 Termination Subroutine
616 ...

800 ...
801 Initialization Subroutine
802 ...
803 //Routine to search a database to for the contemporaneous content identifier based on a timestamp
804
805   Receive a timestamp corresponding to the first content identifier
806
807     Query database containing the log of content identifiers and corresponding timestamps
808       If (Number of matching entries > 0)
809         Retrieve the corresponding record from the database entry matching the timestamp
810           Execute Subroutine to retrieve, from the database entry, the contemporaneous content identifier corresponding to the matching timestamp using processing circuitry
811       Else If (Number of similar entries > 0)
812         Execute Subroutine to retrieve the contemporaneous content identifier corresponding to a timestamp within the threshold time period and that is the closest in time to the timestamp using processing circuitry
813       Else
814         Execute Subroutine to indicate that the verification process failed. using processing circuitry
815
816 ...
817 Termination Subroutine
818 ...

FIG. 8

SYSTEMS AND METHODS FOR IDENTIFYING A SOURCE OF MEDIA CONTENT BASED ON A LOG OF CONTENT IDENTIFIERS

BACKGROUND

Various entities may be interested in receiving information as to the sources of content that different viewers are consuming. In most cases, this can be accomplished by storing information regarding a channel that a set-top box or a television is tuned to and, based on that and a television schedule, information on the source of content that a viewer is consuming may be obtained, stored and used for various purposes (e.g., recommending other content).

However, various environments exist where capturing such information is very difficult. For example, if a viewer is consuming Internet content, scheduling information may not exist for that content. Additionally, if a device that the user is consuming content on does not have access to tuning information (e.g., a TV that is attached to a set-top box where the set-top box performs all the tuning), it is very difficult to determine what channel the set-top box is tuned to. Furthermore current systems fall short when it comes to determining a source of media content in situations where the same content is transmitted from multiple sources nearly simultaneously.

SUMMARY

Accordingly, systems and methods are described herein for identifying a content source of media content being transmitted to a viewer in situations when a specific media asset is being transmitted to the viewer from two different content sources nearly simultaneously. For example, if a certain movie is being broadcast at nearly the same time by two channels, the system is able to identify the channel that the viewer is watching.

Various systems may be configured to monitor content being transmitted to viewers from various content sources and generate fingerprints at a specific time interval (e.g., one minute) based on the media assets being transmitted by the respective content sources. Those fingerprints may be stored in, for example, a database to be used in a process of determining which content source the viewer is consuming content from. For example, a device (e.g., a server) may be configured with a plurality of tuners such that each tuner is tuned to a corresponding channel. The server may then generate a fingerprint for every channel at an interval (e.g., once per minute). The fingerprints may then be stored in a database and be associated with the channel they were generated from.

Furthermore, each user device (e.g., television, smart phone, etc.) may be configured to generate a fingerprint based on media content that is being received by the device and to store the fingerprints in a log. For example, a television may be receiving content from a set-top box such that the set-top box tunes to specific channels and the television receives a stream of media without receiving any tuning information (e.g., channel information). In this case, the device may generate a fingerprint of the content that it is receiving and store it in a log.

When a request is made to identify a content source that a specific viewer is consuming media content from, a fingerprint may be generated based on the media asset that the user is consuming at a specific time and, based on the fingerprint, the media asset may be identified. The system may then return two (or sometimes more) different content sources that are transmitting the media asset nearly simultaneously. For example, two media assets may be transmitted nearly simultaneously if they are transmitted in the same scheduled time slot.

At this point, the system may receive two content sources that are transmitting the same media asset and determine the correct source of content by iterating through contemporaneous fingerprints in order to find a divergent pair of fingerprints. When the divergent pair is found, each fingerprint of the pair is compared to a contemporaneous fingerprint from a log of fingerprints and the fingerprint that matches the fingerprint in the log (described above) is identified as the fingerprint associated with the content source that the viewer is consuming content from.

In some aspects, control circuitry may periodically store, in a log of fingerprints, a fingerprint generated based on media content that the user is consuming at a given time. For example, a viewer may be consuming content on a smart TV that is connected to a set-top box. The set-top box performs all the tuning and only sends media content to the smart TV without sending any source identifying information. The smart TV receives the media content and may periodically (e.g., every second, every 30 seconds, every minute, etc.) generate a fingerprint based on the media content that the smart TV receives. The smart TV may then store the fingerprint in a log file in its storage. Additionally or alternatively, the smart TV may transmit (e.g., via a network) the fingerprint to a server to be stored in a log maintained by the server for the specific smart TV.

In some embodiments, the control circuitry may transmit to a server a request to identify a content source corresponding to a media asset, where the media asset is consumed by the user at a first time, and where the request includes a fingerprint of the media asset generated at the first time. For example, control circuitry of a smart TV may transmit a request to a server to identify a media asset that corresponds to the fingerprint. The server that receives the request and the fingerprint may be a server hosting a database of fingerprints. The received fingerprint may be compared to fingerprints in the database in order to find a match.

In some embodiments, the control circuitry may receive, from the server, a first content source identifier and a second content source identifier, where the first content source identifier and the second content source identifier correspond to a first content source and a second content source, respectively, that are both transmitting the media asset at the first time. Continuing with the example above, when the server that received the fingerprint compares the fingerprint to fingerprints in the database, it may determine that a fingerprint corresponds to a specific media asset (e.g., a specific episode of "Seinfeld"). The server may then search scheduling information (e.g., a database of scheduling information) in order to determine a channel number that this specific episode of "Seinfeld" is being broadcast on. In certain instances, the episode of "Seinfeld" may be transmitted via multiple channels. In those instances, the server will transmit back channel identifiers (e.g., channel numbers) that are transmitting the episode of "Seinfeld." The control circuitry may receive those channel identifiers.

In some embodiments, the control circuitry may transmit, to the server, a request for a first plurality of fingerprints generated based on content transmitted by the first content source and a second plurality of fingerprints generated based on content transmitted by the second content source. As described above, a multitude of tuners and servers may be employed to monitor content being transmitted from various content sources. Both the first content source and the second content source may be part of a group of content sources that are being monitored. Fingerprints may be generated periodically based on content that the first content source and the second content source are transmitting, respectively. The fingerprints may be stored in a database or any other storage and associated with the respective content source. For example, when the control circuitry receives content source identifiers for two channels that are transmitting the specific episode of "Seinfeld," as described above, the control circuitry may send a request to the server for a multitude of fingerprints associated with the first channel that is transmitting the episode of "Seinfeld" and the second channel that is transmitting the episode of "Seinfeld." In some embodiments, the request may include a time interval during which fingerprints should have been generated. Additionally or alternatively, the request may include a number of fingerprints that the control circuitry is to receive from the server for each respective channel.

In some embodiments, the control circuitry may, in response to receiving the first plurality of fingerprints and the second plurality of fingerprints, match each fingerprint from the first plurality of fingerprints with a fingerprint from the second plurality of fingerprints to create a plurality of matched pairs of fingerprints, where the matching is performed based on a time the respective fingerprints were generated. When the server described above receives the request for fingerprints generated based on content transmitted from the first content source and the second content source, the server searches (e.g., through a database) for fingerprints that correspond to the first content source and the second content source, respectively. In some embodiments, the server may search for fingerprints generated during a specific time interval (e.g., a time interval received from the control circuitry, a default time interval, or a pre-configured time interval). In some embodiments, the server may search for a specific number of fingerprints for each content source (e.g., 20, 30, 100, etc.). In yet some other embodiments, the server may search for all fingerprints associated with the first content source and the second content source, respectively, but only transmit a specific number of fingerprints for each respective content source.

When the control circuitry receives the two sets of fingerprints, the control circuitry matches each fingerprint corresponding with the first content source to a fingerprint corresponding with the second content source. The control circuitry creates the matches based on time (e.g., the time the fingerprints were generated), creating pairs of matched fingerprints.

In some embodiments, the control circuitry may iterate through each matched pair of fingerprints in reverse chronological order until a first fingerprint from the first plurality of fingerprints diverges from a second fingerprint from the second plurality of fingerprints, where the iterating includes comparing each fingerprint from the first plurality of fingerprints with a matched fingerprint from the second plurality of fingerprints. The control circuitry may determine which pair of fingerprints was the latest generated and may compare the two fingerprints. If those fingerprints correspond to the same media asset, then the control circuitry may determine the next latest matched pair of fingerprints and compare those to determine whether they correspond to the same media asset. The control circuitry may iterate through all the fingerprints until the comparison shows two fingerprints that diverge (e.g., correspond to different media assets). For example, one fingerprint may correspond to a media asset being transmitted and another to a commercial.

In some embodiments, the control circuitry compares the first fingerprint from the first plurality of fingerprints to a contemporaneous fingerprint stored in the log of fingerprints and compares the second fingerprint from the second plurality of fingerprints to the contemporaneous fingerprint stored in the log of fingerprints to determine whether the first fingerprint from the first plurality of fingerprints or the second fingerprint from the second plurality of fingerprints matches the contemporaneous fingerprint from the log of fingerprints. For example, if the control circuitry determines that one fingerprint from the pair of matching fingerprints corresponds to a commercial and another to a movie currently being consumed by the viewer, the control circuitry searches the log of fingerprints, mentioned above, for a fingerprint that is contemporaneous to the matched pair. In some embodiments, there may not be a contemporaneous fingerprint that exists in the log of fingerprints. In those cases, a fingerprint is identified from the log of fingerprints that has been generated the closest in time to the matched pair of divergent fingerprints.

When the control circuitry determines which fingerprint from the log of fingerprints is a correct contemporaneous or nearly contemporaneous fingerprint, the control circuitry may compare that fingerprint with each fingerprint of the pair of matched divergent fingerprints. The control circuitry may make the comparison in several ways. For example, the control circuitry may determine a media asset (e.g., movie, commercial, show episode, etc.) that corresponds to each fingerprint and then determine which media asset corresponds to the contemporaneous fingerprint. The control circuitry may then determine which media asset (the media asset transmitted from the first content source or from the second content source) matches the media asset corresponding to the fingerprint retrieved from the log of fingerprints. In another example, the control circuitry may compare the fingerprints themselves. The control circuitry may extract from each fingerprint data that is unique to each corresponding media asset and compare the data of the first and second fingerprints with the data of the contemporaneous fingerprint.

In some embodiments, the control circuitry determines whether the first content source or the second content source is a source of content that the user is presently consuming based on whether the first fingerprint from the first plurality of fingerprints or the second fingerprint from the second plurality of fingerprints matches the contemporaneous fingerprint from the log of fingerprints. When the control circuitry determines which fingerprint matches the contemporaneous fingerprint, the control circuitry may determine which content source (e.g., channel) the matching fingerprint corresponds to and thus, the content source that the viewer is consuming the content from.

In some embodiments, the control circuitry generates a fingerprint based on the media content that the user is consuming at the given time on a first device and the log of fingerprints is located at a second device. For example, a fingerprint may be generated on a smart TV or a smart phone, but the log of fingerprints may be stored on a server that can be accessed through the Internet. The log of fingerprints may be associated with a specific device (e.g., via a device identifier).

In some embodiments, the control circuitry performs the following when comparing the first fingerprint from the first plurality of fingerprints to the contemporaneous fingerprint stored in the log of fingerprints and comparing the second fingerprint from the second plurality of fingerprints to the contemporaneous fingerprint stored in the log of fingerprints.

The control circuitry transmits, to a second device, a request for the contemporaneous fingerprint, where the request includes a time when the first fingerprint was generated. For example, the fingerprint log may be located at a server that is reachable via a network (e.g., via the Internet). The control circuitry may transmit to the server a request for a fingerprint from the log of fingerprints together with the required generation time of the fingerprint. The server may then search the log of fingerprints for a fingerprint that was generated at the same time as the received time or a fingerprint generated closest to the received time. When the server locates the correct fingerprint, the server transmits the fingerprint back.

The control circuitry then receives, from the second device, the contemporaneous fingerprint, where the contemporaneous fingerprint was generated closer to the time when the first fingerprint was generated than any other fingerprint in the log of fingerprints. For example, if the generation time that the server received is 1:00 PM and the fingerprint closest in time was generated at 1:01 PM, the server transmits that fingerprint back.

In some embodiments, the request for the first plurality of fingerprints generated based on the content transmitted by the first content source and the second plurality of fingerprints generated based on the content transmitted by the second content source includes a time range and an instruction to the server to transmit fingerprints generated during the time range. For example, the request may include a time range between 1:00 PM and 1:30 PM and an instruction to transmit the fingerprints generated during that time range from the respective content sources.

In some embodiments, the control circuitry identifies the first content source as the source of content that the user is presently consuming and generates for display a user-selectable indication of the second content source. For example, a viewer may be consuming streaming content from an Internet content source. A second Internet content source may be streaming the same content. The control circuitry, after determining which content source the user is consuming content from, may generate for display an option for the viewer to switch to the other content source. In some embodiments, in response to a user selection of the user-selectable indication, the control circuitry may generate for display content from the second content source. When the user selects the option, the control circuitry may switch to the second content source. In some embodiments, the control circuitry may switch from a broadcast source to an Internet source, or vice versa.

In some embodiments, the control circuitry when matching each fingerprint from the first plurality of fingerprints with the fingerprint from the second plurality of fingerprints to create the plurality of matched pairs of fingerprints may first receive for each fingerprint from the first plurality of fingerprints and the second plurality of fingerprints a time each fingerprint from the first plurality of fingerprints and the second plurality of fingerprints, respectively, was generated. For example, the control circuitry may receive 15 fingerprints for each content source together with the corresponding times the fingerprints were generated.

The control circuitry may then index the first plurality of fingerprints and the second plurality of fingerprints by time. For example, the control circuitry may determine a time range of the fingerprints and create an index for each time interval (e.g., one minute). The control circuitry may then match each fingerprint from the first plurality of fingerprints with a corresponding fingerprint from the second plurality of fingerprints according to the index. The control circuitry may then link the fingerprints from both pluralities, based on time, to the appropriate time interval in the index.

In some embodiments, when matching each fingerprint from the first plurality of fingerprints with the fingerprint from the second plurality of fingerprints to create the plurality of matched pairs of fingerprints, the control circuitry may sort the first plurality of fingerprints in reverse chronological order and also sort the second plurality of fingerprints in reverse chronological order. For example, if the control circuitry receives six fingerprints for each content source that were generated between 1:00 PM and 1:05 PM at one-minute intervals, the control circuitry may sort the fingerprints starting with the fingerprints generated at 1:05 PM and going back to fingerprints generated at 1:00 PM. The control circuitry may then match each fingerprint from the first plurality of fingerprints with a corresponding fingerprint from the second plurality of fingerprints according to the sorting order. The control circuitry may then pair the fingerprint from the first plurality that was generated at 1:05 PM with a fingerprint from the second plurality that was generated at 1:05 PM or another time that represents the latest generated fingerprint. The control circuitry may then pair the rest of the fingerprints in the same manner.

In some embodiments, the control circuitry may, when comparing the first fingerprint from the first plurality of fingerprints to the contemporaneous fingerprint stored in the log of fingerprints and comparing the second fingerprint from the second plurality of fingerprints to the contemporaneous fingerprint stored in the log of fingerprints, first determine a time the first fingerprint from the first plurality of fingerprints was generated. For example the control circuitry may retrieve the generation time corresponding to the first fingerprint from the same database where the fingerprint was stored. The control circuitry may also transmit a request to the server that transmitted the fingerprint for the generation time.

The control circuitry may then search for the contemporaneous fingerprint by identifying a fingerprint in the log of fingerprints that was generated closest in time to the first fingerprint and compare both the first fingerprint and the second fingerprint with the contemporaneous fingerprint. For example, if the first fingerprint was generated at 1:00 PM and the log of fingerprints has fingerprints that were generated at 12:59 PM and 1:03 PM, the control circuitry may select the fingerprint generated at 12:59 PM because it is the closest in time.

In some embodiments, the control circuitry may determine that the first fingerprint from the first plurality of fingerprints diverges from the second fingerprint from the second plurality of fingerprints by first transmitting, to a server, a request to identify a first media asset corresponding to the first fingerprint. The control circuitry may then transmit, to the server, a request to identify a second media asset corresponding to the second fingerprint. For example, if the first media asset corresponds to an episode of "Friends" and the second media asset corresponds to a commercial, the control circuitry may receive different media asset identifiers for the corresponding media assets.

The control circuitry may then compare a first media asset identifier corresponding to the first media asset and a second media asset identifier corresponding to the second media asset. Continuing with the example above, if the first media asset identifier corresponds to an episode of "Friends" and the second media asset identifier corresponds to a commercial, the media asset identifiers will not match. If the media identifiers do not match, the control circuitry may determine that the first fingerprint diverges from the second fingerprint.

In some embodiments, the log of fingerprints is located on a device where the fingerprint generated based on the media content that the user is consuming at the given time is generated. For example, the log of fingerprints may be located on a smart TV or a smart phone that generates the fingerprints.

In some aspects, determining a source of content that the user is presently consuming involves periodically generating fingerprints based on media content that the user is consuming at a given time. As described above, a smart TV or a smart phone may be periodically (e.g., every minute or more often) generating fingerprints of content that the viewer is consuming.

In some embodiments, for each generated fingerprint, the control circuitry may determine a content identifier, where the content identifier corresponds to a respective media asset. The control circuitry may also store, in a log, the content identifier and a timestamp, where the timestamp corresponds to a time that the fingerprint was generated. For example, when the control circuitry generates a fingerprint, the control circuitry may transmit a request to a server for a content identifier (e.g., a unique alphanumeric string) that corresponds to the media asset. When the control circuitry receives the content identifier, the control circuitry may store the content identifier together with a timestamp in a log.

In some embodiments, the control circuitry may transmit to a server a request to identify a content source corresponding to a media asset, where the media asset is consumed by the user at a first time, and where the request includes a fingerprint generated at the first time based on the media asset. As described above, the control circuitry may transmit a request to a server to identify a media asset (e.g., an episode of "Seinfeld") based on a fingerprint generated from the content source that the viewer is consuming content from. The server may, for example, query a database that stores fingerprints and corresponding media assets and have the database execute a comparison between the generated fingerprint and the fingerprints in the database.

In some embodiments, the control circuitry may receive, from the server, a first content source identifier and a second content source identifier, where the first content source identifier and the second content source identifier correspond to a first content source and a second content source, respectively, that are both transmitting the media asset at the first time. Continuing with the example above, the server may transmit back content source identifiers corresponding to the two content sources (e.g., two separate channels that are transmitting the specific episode of "Seinfeld"). The control circuitry may receive those content source identifiers.

In some embodiments, the control circuitry may transmit, to the server, a request for a first plurality of content identifiers and corresponding timestamps and a second plurality of content identifiers and corresponding timestamps, where the first plurality of content identifiers and the second plurality of content identifiers correspond to content transmitted by the first content source and by the second content source, respectively. For example, if the control circuitry receives two separate channels that are transmitting the same episode of "Seinfeld," the control circuitry may request from the server content identifiers corresponding to content transmitted via those two channels.

In some embodiments, the control circuitry may, in response to receiving the first plurality of content identifiers and the second plurality of content identifiers, match each content identifier from the first plurality of content identifiers with a content identifier from the second plurality of content identifiers to create a plurality of matched pairs of content identifiers. The control circuitry may perform the matching based on a timestamp associated with the respective content identifiers. For example, if the control circuitry receives six content identifiers for each content source that are time stamped between 1:00 PM and 1:05 PM respectively, the control circuitry may match a content identifier from the first plurality of content identifiers time stamped 1:05 PM with a content identifier from the second plurality of content identifiers that was also time stamped 1:05 PM.

In some embodiments, the control circuitry may iterate through each matched pair of content identifiers in reverse chronological order until a first content identifier from the first plurality of content identifiers diverges from a second content identifier from the second plurality of content identifiers. The control circuitry may perform the iteration by comparing each content identifier from the first plurality of content identifiers with a matched content identifier from the second plurality of content identifiers. For example, if each content identifier is an alphanumeric string of characters, corresponding to a media asset, the control circuitry may compare the alphanumeric strings to determine at what point they are not the same. The iteration may be done in the same manner as described above in relation to iterating through matched fingerprints.

In some embodiments, the control circuitry may compare the first content identifier from the first plurality of content identifiers to a contemporaneous content identifier stored in the log and compare the second content identifier from the second plurality of content identifiers to the contemporaneous content identifier stored in the log. The control circuitry performs the comparison in order to determine whether the first content identifier from the first plurality of content identifiers or the second content identifier from the second plurality of content identifiers matches the contemporaneous content identifier from the log. For example, if a matched pair of fingerprints that diverge correspond to a movie and a commercial respectively, the content identifiers of the pair are each compared to a contemporaneous identifier in the log and the matching content identifier is determined.

In some embodiments, the control circuitry may determine whether the first content source or the second content source is a source of content that the user is presently consuming based on whether the first content identifier from the first plurality of content identifiers or the second content identifier from the second plurality of content identifiers matches the contemporaneous content identifier from the log. When the control circuitry determines which content identifier matches the contemporaneous content identifier from the log, the control circuitry may determine the content source that is associated with the content identifier, and thus, determine the source of content that the user is consuming.

In some embodiments the fingerprints may be generated on one device and the log where the content identifiers corresponding to the fingerprints are stored may be located on another device. In some embodiments the log may be located on the same device where the fingerprints are generated.

In some embodiments, the control circuitry, when comparing the first content identifier from the first plurality of content identifiers to the contemporaneous content identifier stored in the log and comparing the second content identifier from the second plurality of content identifiers to the contemporaneous content identifier stored in the log, may transmit, to the second device, a request for the contemporaneous content identifier. The request may include a timestamp associated with the first content identifier. For example, the control circuitry may transmit to the server a timestamp of 1:00 PM as a timestamp of the first divergent content identifier in the matched pair.

The control circuitry may then receive, from the remote server, the contemporaneous content identifier, where the contemporaneous content identifier corresponds to a timestamp closer in time to the timestamp of the first content identifier than to a timestamp of any other content identifier in the log. In continuing with the example above, the server may search the log for a content identifier that was stored closest to 1:00 PM. For example, if there are two content identifiers in the log where one was stored at 1:01 PM and another stored at 12:57 PM, the server selects as the contemporaneous identifier the content identifier that was stored at 1:01 PM.

In some embodiments, the request for the first plurality of content identifiers associated with the content transmitted by the first content source and the second plurality of content identifiers associated with the content transmitted by the second content source includes a time range and an instruction to the server to transmit back content identifiers with corresponding timestamps in the time range. For example, the request may include a time range between 1:00 PM and 1:30 PM and an instruction to transmit the content identifiers with corresponding timestamps in that time range.

In some embodiments, the control circuitry may identify the first content source as the source of content that the user is presently consuming and generate for display a user-selectable indication of the second content source. For example, a viewer may be consuming streaming content from an Internet content source. A second Internet content source may be streaming the same content. The control circuitry, after determining which content source the user is consuming content from, may generate for display an option for the viewer to switch to the other content source. In some embodiments, in response to a user selection of the user-selectable indication, the control circuitry may generate for display content from the second content source. When the user selects the option, the control circuitry may switch to the second Internet source. In some embodiments, the control circuitry may switch from a broadcast source to an Internet source or vice versa.

In some embodiments, the control circuitry may, when matching each content identifier from the first plurality of content identifiers with the content identifier from the second plurality of content identifiers to create the plurality of matched pairs of content identifiers, perform the following actions. The control circuitry may index the first plurality of content identifiers and the second plurality of content identifiers by time, based on respective timestamps. The control circuitry may then match each content identifier from the first plurality of content identifiers with a corresponding content identifier from the second plurality of content identifiers according to the index. The indexing and the matching may be done in the same manner as described above with respect to fingerprints. The control circuitry may use timestamps corresponding to respective content identifiers in order to index by time and match by time.

In some embodiments, the control circuitry may, when matching each content identifier from the first plurality of content identifiers with the content identifier from the second plurality of content identifiers to create the plurality of matched pairs of content identifiers, perform the following. The control circuitry may sort the first plurality of content identifiers in reverse chronological order based on timestamps associated with the first plurality of content identifiers, respectively, and sort the second plurality of content identifiers in reverse chronological order based on timestamps associated with the second plurality of content identifiers, respectively. The control circuitry may then match each fingerprint from the first plurality of content identifiers with a corresponding content identifier from the second plurality of content identifiers according to the sorting order. The control circuitry may perform the sorting and the matching using the timestamps and in the same manner as with respect to fingerprints, as described above.

In some embodiments, the control circuitry may, when comparing the first content identifier from the first plurality of content identifiers to the contemporaneous content identifier stored in the log and comparing the second content identifier from the second plurality of content identifiers to the contemporaneous content identifier stored in the log, perform the following. The control circuitry may determine a timestamp corresponding to the first content identifier from the first plurality of content identifiers. The control circuitry may then search for the contemporaneous content identifier by identifying a content identifier in the log that corresponds to a timestamp closer in time to the timestamp of the first content identifier than to a timestamp of any other content identifier in the log. The control circuitry may make the identification based on the timestamps of the content identifiers stored in the log. The control circuitry may then compare both the first content identifier and the second content identifier with the contemporaneous content identifier. For example, the control circuitry may compare the alphanumeric strings to determine which content identifier matches the contemporaneous content identifier in the log.

In some embodiments, the control circuitry may encounter a media asset that has not been earlier fingerprinted (e.g., a program that is being transmitted for the first time). In those cases, the control circuitry may generate a media fingerprint based on media content being transmitted.

The control circuitry may then identify a media asset corresponding to the media fingerprint by cross-referencing a time the fingerprint was generated and a content source corresponding to the media fingerprint with scheduling data. For example, if a new movie is being transmitted, the control circuitry may access scheduling data and determine the title of the movie and other identifying metadata by searching through scheduling data for the appropriate time and channel.

The control circuitry may then perform a search for the media asset in a database that stores media asset identifiers and corresponding content identifiers. For example, when the control circuitry identifies the movie, the control circuitry may search a database to determine if that movie has been identified earlier and whether a content identifier (e.g., an alphanumeric string) for that movie exists in the database. The control circuitry may then, based on the search returning no results, generate a content identifier for the media asset corresponding to the media fingerprint. If the movie is not in the database, the control circuitry may create a new content identifier for the movie and store the fingerprint and the content identifier in the database for future use.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 5 depicts illustrative processes involved in determining whether a first content source or a second content source is a source of content that the user is presently consuming, in accordance with some embodiments of this disclosure;

FIG. 6 depicts illustrative pseudocode involved in determining whether the first content source or the second content source is a source of content that the user is presently consuming, in accordance with some embodiments of this disclosure;

FIG. 8 is pseudocode involved in searching a database for the contemporaneous content identifier based on a timestamp, in accordance with some embodiments of this disclosure;

DESCRIPTION

Figure 1:
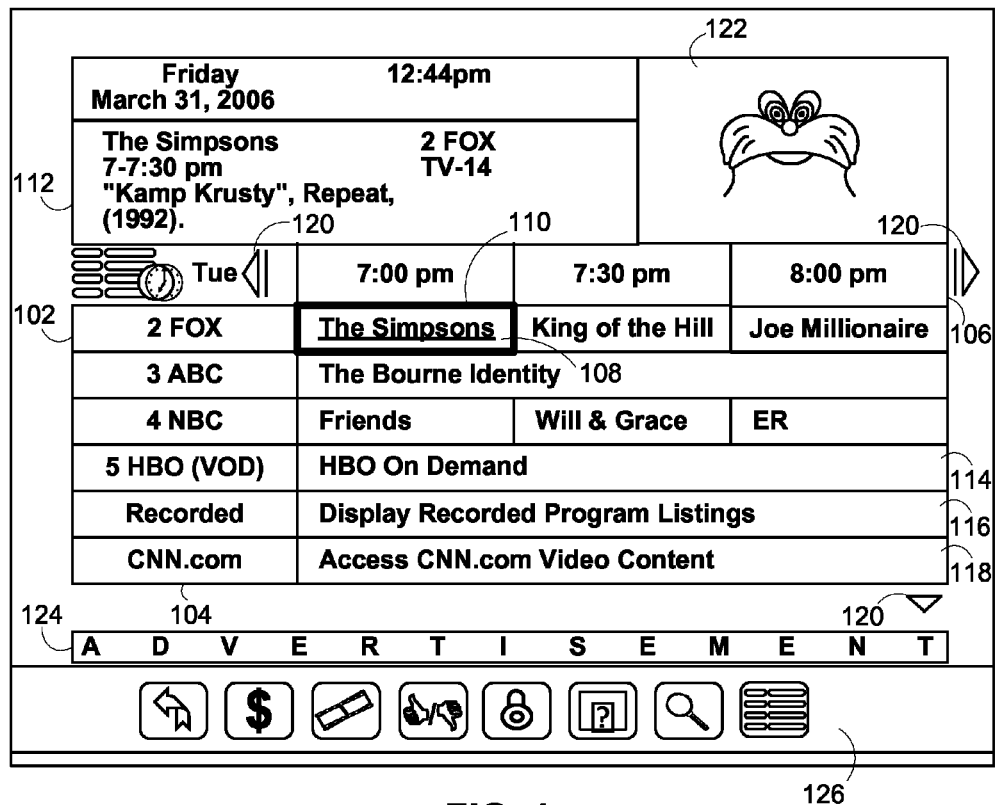
FIG. 1 shows an illustrative embodiment of a display screen that may be used to provide media guidance application listings and other media guidance information, in accordance with some embodiments of the disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
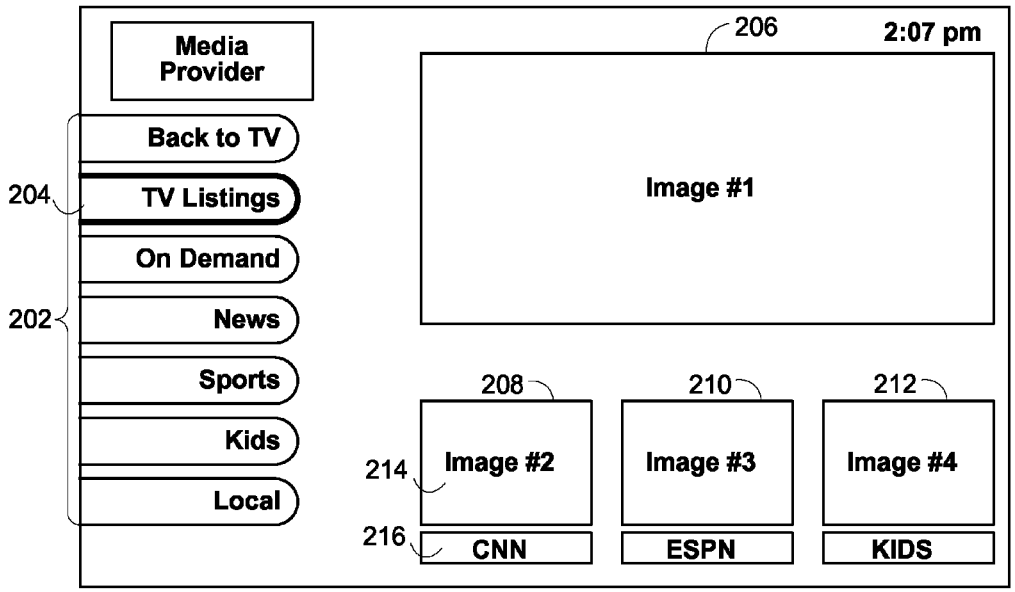
FIG. 2 shows another illustrative embodiment of a display screen that may be used to provide media guidance application listings, in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
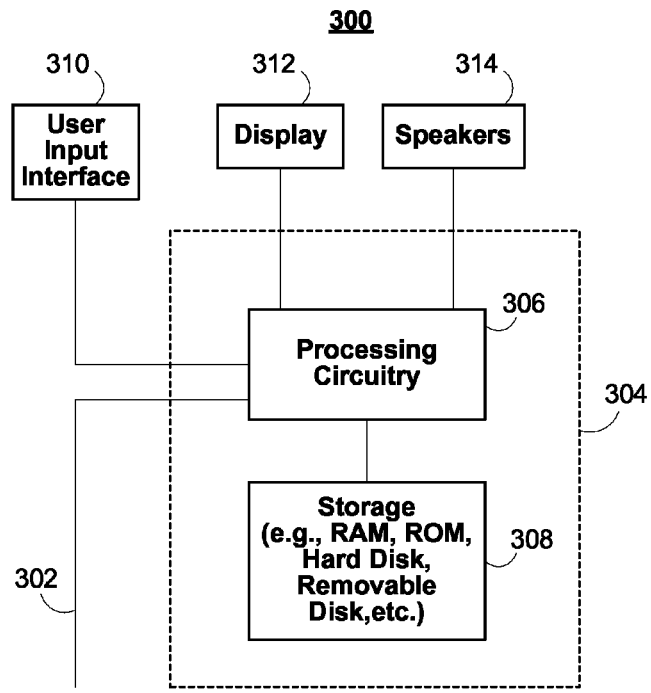
FIG. 3 is a block diagram of an illustrative device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
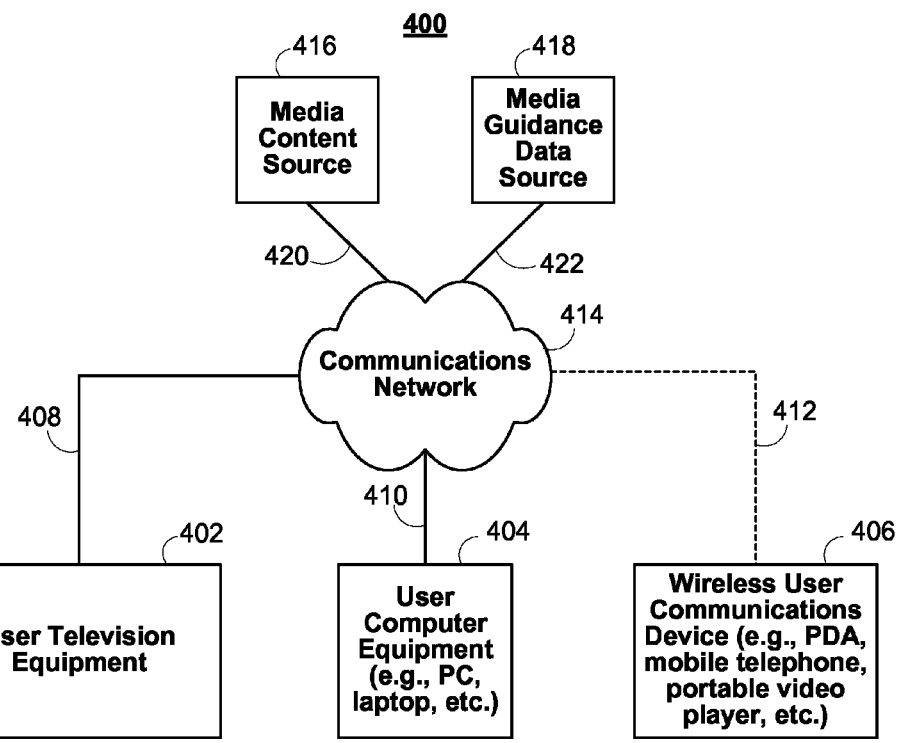
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred herein, the term "in response to" refers to initiated as a result of. For example, a first action being performed in response to another action may include interstitial actions between the first action and the second action. As referred herein, the term "directly in response to" refers to caused by. For example, a first action being performed directly in response to another action may not include interstitial actions between the first action and the second action.

In some aspects, it may be useful to determine a source of content that a user is presently consuming. To that effect, control circuitry (e.g., control circuitry 304) may periodically store, in a log of fingerprints, a fingerprint generated based on media content that the user is consuming at a given time. As referred to herein, the term "fingerprint" refers to a sample of a media asset on which an algorithm is executed in order to extract data from the sample that is enough to identify the media asset as the only matching media asset. For example, for a video a fingerprint may be generated based on a plurality of frames extracted from the video. For a video with sound the frames may be extracted along with accompanying sound samples in order to form a fingerprint. For example, control circuitry of a device (e.g., device 402, 404, or 406) may generate a fingerprint based on content that the device is receiving and presenting to a user. The control circuitry (e.g., control circuitry 304) may generate a fingerprint every minute. Of course a fingerprint may be generated more often (e.g., every 30 seconds, 1 second, half of a second, etc.). The fingerprint is then stored in a log of fingerprints. In some embodiments the log of fingerprints may be stored (e.g., in storage 308) on the same device that fingerprints are generated on. The log of fingerprints may be stored in a database or a file that is able to accommodate a structure needed for storage (e.g., an XML file). In some embodiments the fingerprint log may be stored on a different device (e.g., at a device located at media content source 416 or media guidance data source 418).

In some embodiments, control circuitry (e.g., control circuitry 304) may transmit to a server a request to identify a content source corresponding to a media asset that is consumed by the user at a first time. The request may include a fingerprint of the media asset generated at the first time. For example, control circuitry 304 (FIG. 3) may transmit, to a server (e.g., via communications network 414) located at media content source 416 and/or media guidance data source 418, the request. The control circuitry may transmit the request via any known protocols (e.g., TCP/IP).

In some embodiments, the control circuitry (e.g., control circuitry 304) may receive, from the server, a first content source identifier and a second content source identifier, where the first content source identifier and the second content source identifier correspond to a first content source and a second content source, respectively, that are both transmitting the media asset at the first time. As referred to herein, the term "content source identifier" refers to a set of characters or graphics that uniquely identify a content source. For example, a channel may be referred to as a content source. A channel may be identified by a number or a combination of a number and a network. Another example of a content source may be an Internet content source. An identifier of the Internet content source may be an Internet address associated with the content source. In another example, the control circuitry (e.g., control circuitry 304) may receive from the server (e.g., a server associated with media content source 416 or media guidance data source 418) an alphanumeric string that represents a channel.

In some embodiments, control circuitry (e.g., control circuitry 304) may transmit, to the server, a request for a first plurality of fingerprints generated based on content transmitted by the first content source and a second plurality of fingerprints generated based on content transmitted by the second content source. For example, control circuitry 304 may transmit to the server (e.g., a server associated with media content source 416 and/or media guidance data source 418) a request for a multitude of fingerprints for each content source. Instead of one request, control circuitry 304 may transmit two requests to the server, each request corresponding to a content source. In both cases, the requests may include a content source identifier (e.g., an alphanumeric string of characters). The fingerprints and the corresponding content source identifiers may be stored in a database on the server or on another server where they can be accessed. Each content source identifier may be linked to all the fingerprints generated from the corresponding content by, for example, an index. When the server receives the request, the server may search the database for the appropriate fingerprints by generating a database query that includes the content source identifier and executing the query against the database. The server may then transmit back the appropriate fingerprints.

In some embodiments, as described above, the server may be configured to send back fingerprints for a certain time period (e.g., 30 minutes prior to the request). For example, if the control circuitry transmits the request for the fingerprints at 3:00 PM, the server may send back all fingerprints that were generated based on a specific content source between 2:30 PM and 3:00 PM. Of course other time intervals are possible (e.g., five minutes, 10 minutes, 15 minutes, etc.). In some embodiments, the server may be configured to send back a certain number of fingerprints that were generated based on the appropriate content source. For example, a server may be configured to send back 50 fingerprints that were generated based on the appropriate content source. In some embodiments, the control circuitry (e.g., control circuitry 304) may include either a range of time in the request and/or a number of fingerprints to receive back from the server. The control circuitry (e.g., control circuitry 304) may include an instruction in the request to receive the fingerprints in the time range and/or the number of fingerprints. For example, the control circuitry (e.g., control circuitry 304) may send a request to the server at 2:00 PM. In the request, the control circuitry may instruct the server to transmit back fingerprints for the past 30 minutes, but only up to 30 fingerprints should be included in the response.

In some embodiments, control circuitry 304 may in response to receiving the first plurality of fingerprints and the second plurality of fingerprints, match each fingerprint from the first plurality of fingerprints with a fingerprint from the second plurality of fingerprints. As a result of the matching, control circuitry 304 may create a plurality of matched pairs of fingerprints, where the matching is performed based on a time the respective fingerprints were generated. For example, control circuitry 304 may receive twenty fingerprints for the first content source and twenty fingerprints for the second content source. Control circuitry 304 may store the fingerprints in storage 308. Specifically, control circuitry 304 may store the fingerprints in a data structure such as an array or a linked list. Control circuitry 304 may use, for example, one array for fingerprints corresponding to the first content source and another array for fingerprints corresponding to the second content source. Control circuitry 304 may then, for every fingerprint from the first plurality, create a link to a fingerprint from the second plurality. Control circuitry 304 may compare a time the specific fingerprint from the first plurality of fingerprints was generated with a generation time of each fingerprint from the second plurality of fingerprints and select the fingerprint with the closest generation time as a matching fingerprint.

In some embodiments, control circuitry 304 may iterate through each matched pair of fingerprints in reverse chronological order until a first fingerprint from the first plurality of fingerprints diverges from a second fingerprint from the second plurality of fingerprints. Each iteration may involve control circuitry 304 comparing a fingerprint from the first plurality of fingerprints with a matched fingerprint from the second plurality of fingerprints. For example, control circuitry 304 may retrieve from a first data structure described above the latest fingerprint from the first plurality of fingerprints. Control circuitry 304 may also retrieve from a second data structure the latest fingerprint from the second plurality of fingerprints. Control circuitry 304 may compare the retrieved fingerprints. If control circuitry 304 determines that there is no match, control circuitry 304 may mark the fingerprints as divergent and not continue iterating through the rest of the fingerprints. If control circuitry 304 determines that the two fingerprints match, control circuitry 304 may retrieve, from the first data structure, the next latest fingerprint from the first plurality of fingerprints and, from the second data structure, the next latest fingerprint from the second plurality of fingerprints. Control circuitry 304 may compare the fingerprints in order to determine a match. If control circuitry 304 determines that the two fingerprints match, control circuitry 304 may continue iterating through the rest of the matched pairs in reverse chronological order until control circuitry 304 determines that two fingerprints in a matched pair of fingerprints diverge. As referred to herein, the term "divergent fingerprints" refers to a matched pair of fingerprints where, when stepping backwards in time through matched pairs of fingerprints that converge (i.e., fingerprints that map to the same media asset), the fingerprints in the matched pair of fingerprints do not map to the same media asset.

In some embodiments, control circuitry 304 may compare the first fingerprint from the first plurality of fingerprints to a contemporaneous fingerprint stored in the log of fingerprints and compare the second fingerprint from the second plurality of fingerprints to the contemporaneous fingerprint stored in the log of fingerprints. Control circuitry 304 may perform the comparison in order to determine whether the first fingerprint from the first plurality of fingerprints or the second fingerprint from the second plurality of fingerprints matches the contemporaneous fingerprint from the log of fingerprints. Control circuitry 304 may perform the comparison, for example, by determining a corresponding media asset for the first fingerprint, the second fingerprint, and the contemporaneous fingerprint. Control circuitry 304 may then compare a media asset identifier associated with the first fingerprint with a media asset identifier associated with the contemporaneous fingerprint. If no match is found, then control circuitry 304 may compare a media asset identifier associated with a second fingerprint with a media asset identifier associated with the contemporaneous fingerprint from the fingerprint log. If either the first fingerprint or the second fingerprint matches the contemporaneous fingerprint, control circuitry 304 may store the results of the match in storage 308. If neither fingerprint matches, control circuitry 304 may mark the content source identification operation as a failure. For example, if the viewer switched channels between a time of fingerprint divergence and a time when a content source identification request was generated, control circuitry 304 may find a match. Control circuitry 304 may record a channel change as a result of a content source identification operation.

In some embodiments, control circuitry 304 may determine whether the first content source or the second content source is a source of content that the user is presently consuming based on whether the first fingerprint from the first plurality of fingerprints or the second fingerprint from the second plurality of fingerprints matches the contemporaneous fingerprint from the log of fingerprints. After determining which of the first fingerprint and the second fingerprint matches the contemporaneous fingerprint, control circuitry 304 may record in storage 308 that either the first content source or the second content source is the content source that the viewer is consuming content from.

In some embodiments, the fingerprint generated based on the media content that the user is consuming at the given time is generated on a first device and the log of fingerprints is located at a second device. For example, the log of fingerprints may be located at a server remote to a device where control circuitry 304 performs its tasks. For example the log of fingerprints may be stored at media content source 416 and/or at media guidance data source 418. The log of fingerprints may be divided between the two locations. Control circuitry 304 may access the log of fingerprints via communications network 414. The log of fingerprints may be linked with a specific device via a device identifier. For example, each device where control circuitry 304 performs its tasks may have a serial number or a model number and a serial number. Thus, each log of fingerprints may be tagged with a combination of a serial number and model number. Additionally or alternatively, each log of fingerprints may be linked to a hardware address of the corresponding device. A media access control ("MAC") address may be one such example.

In some embodiments, when the log of fingerprints is stored on a different device from the device where the fingerprints are generated, control circuitry 304, when comparing the first fingerprint from the first plurality of fingerprints to the contemporaneous fingerprint stored in the log of fingerprints and comparing the second fingerprint from the second plurality of fingerprints to the contemporaneous fingerprint stored in the log of fingerprints, performs the following actions.

Control circuitry 304 may transmit, to the second device, a request for the contemporaneous fingerprint, where the request includes a time when the first fingerprint was generated. For example, control circuitry 304 may transmit the request to a server associated with media content source 416 or media guidance data source 418. In some embodiments control circuitry 304 may transmit the request to both media content source 416 and media guidance data source 418. Control circuitry 304 may include in the request a time when the first fingerprint was generated.

Control circuitry 304 may then receive, from the second device, the contemporaneous fingerprint, where the contemporaneous fingerprint was generated closer to the time when the first fingerprint was generated than any other fingerprint in the log of fingerprints. For example, if the first fingerprint was generated at 1:00 PM, a server that receives the request may use the 1:00 PM time to search for the fingerprint in the fingerprint log that was generated closest to 1:00 PM. The server may then send the appropriate fingerprint back to be received by control circuitry 304.

In some embodiments, the request for the first plurality of fingerprints generated based on the content transmitted by the first content source and the second plurality of fingerprints generated based on the content transmitted by the second content source includes a time range and an instruction to the server to transmit fingerprints generated during the time range. For example, control circuitry 304 may transmit the request to a server associated with media content source 416 or media guidance data source 418. The request may include a time range of 1:00 PM to 1:15 PM. The server may then transmit back fingerprints generated during the time range.

In some embodiments, control circuitry 304 may identify the first content source as the source of content that the user is presently consuming. For example, control circuitry 304 may identify channel four as the content source that the viewer is consuming content from when channel four and channel five are both broadcasting the same movie nearly simultaneously. In some embodiments, control circuitry 304 may generate for display a user-selectable indication of the second content source. In the example above, control circuitry 304 may generate for display graphic and/or text representing channel five. The graphic may be selectable by the viewer. In some embodiments, control circuitry 304 may in response to a user selection of the user-selectable indication, generate for display content from the second content source. In continuing with the example above, when the viewer selects the graphic of channel five, control circuitry 304 may change the channel from channel four to channel five.

In some embodiments, control circuitry 304, when matching each fingerprint from the first plurality of fingerprints with the fingerprint from the second plurality of fingerprints to create the plurality of matched pairs of fingerprints, may receive for each fingerprint from the first plurality of fingerprints and the second plurality of fingerprints a time each fingerprint from the first plurality of fingerprints and the second plurality of fingerprints, respectively, was generated. Control circuitry 304 may then index the first plurality of fingerprints and the second plurality of fingerprints by time and match each fingerprint from the first plurality of fingerprints with a corresponding fingerprint from the second plurality of fingerprints according to the index. The indexing and the matching may further be described in relation to FIG. 12. Control circuitry 304 may store fingerprints from the first plurality of fingerprints and the second plurality of fingerprints in data structures 1202 and 1214, respectively. As described above, data structures 1202 and 1214 may be arrays, linked lists, or any other data structure. Each data structure 1202 and 1214 may include fingerprints, represented by items 1206 and 1216 respectively, and generation times for each fingerprint, represented by times 1204 and 1218. Control circuitry 304 may generate index 1208. Index 1208 may include times 1210. In some embodiments, index 1208 may include time ranges. For example, 30 second time intervals, 10 second time intervals, etc. Each time 910 in index 1208 may include a link 1212 to a fingerprint in data structure 902 and a matching fingerprint in data structure 1214.

Figure 12:
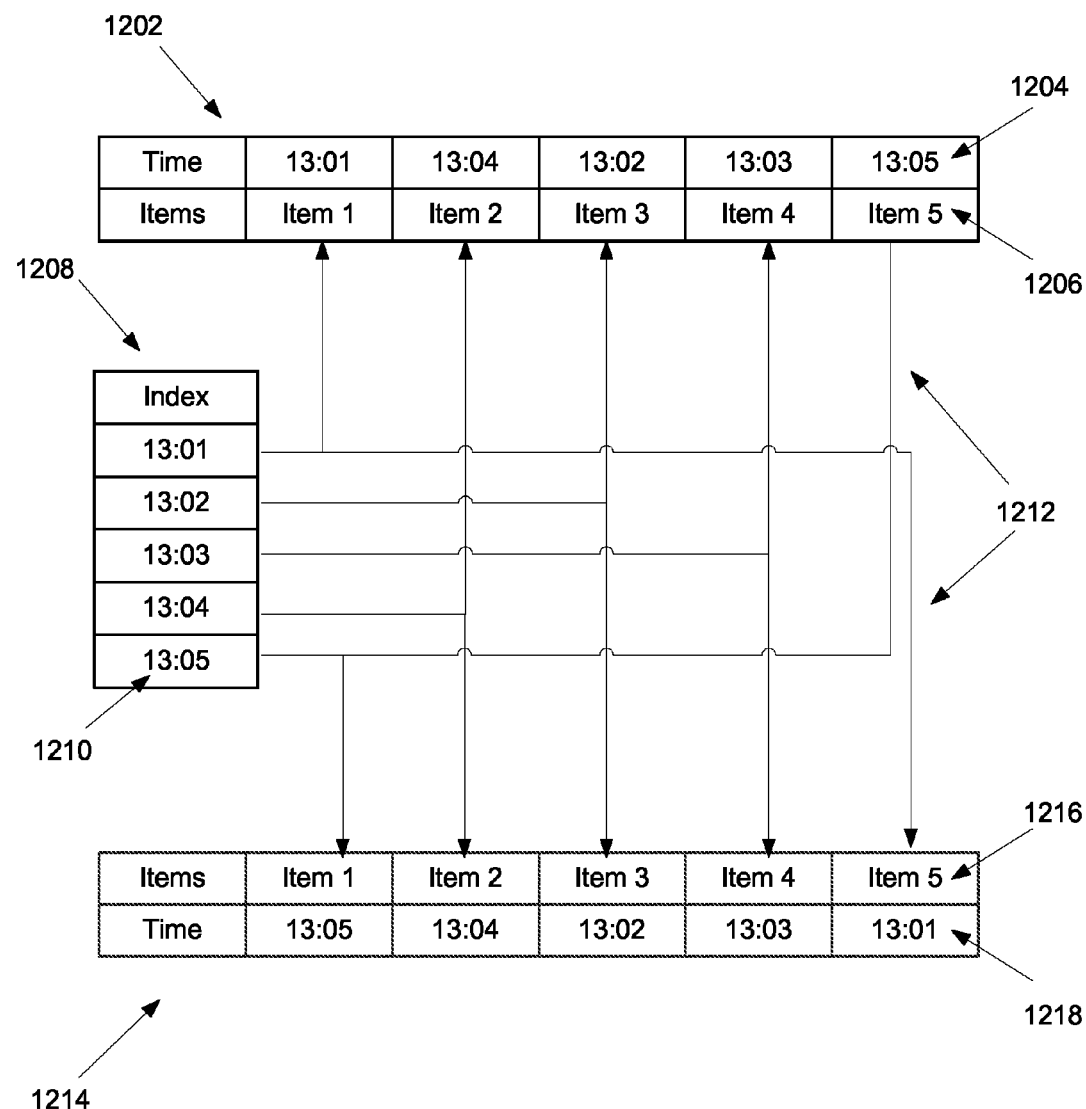
FIG. 12 is an illustration of one possible method of matching fingerprints or content identifiers so they can be compared, in accordance with some embodiments of this disclosure.

Control circuitry 304 may perform the indexing operation by first determining the latest and the earliest generation times corresponding to the fingerprints in the first plurality of fingerprints. As illustrated in FIG. 12 by data structures 1200, control circuitry 304 may then create entries in the index based on the generation times. When the index is created, control circuitry 304 may create links 1212 to the appropriate fingerprints based on the generation times.

In some embodiments, control circuitry 304, when matching each fingerprint from the first plurality of fingerprints with the fingerprint from the second plurality of fingerprints to create the plurality of matched pairs of fingerprints, may sort the first plurality of fingerprints in reverse chronological order and sort the second plurality of fingerprints in reverse chronological order. For example, control circuitry 304 may iterate through the first plurality of fingerprints, and determine the latest fingerprint based on its generation time. Control circuitry 304 may create an array or use another data structure and link the latest fingerprint from the first plurality of fingerprints to the first location in the array. Control circuitry 304 may repeat the process for the next latest fingerprint as well as every fingerprint in the first plurality of fingerprints. Control circuitry 304 may then create another instance of the same data structure and repeat the process described above for the second plurality of fingerprints.

Control circuitry 304 may then match each fingerprint from the first plurality of fingerprints with a corresponding fingerprint from the second plurality of fingerprints according to the sorting order. For example, control circuitry 304 may match the first item in the data structure corresponding to the first plurality of fingerprints to the first item in the data structure corresponding to the second plurality of fingerprints. Control circuitry 304 may move down in reverse chronological order and match the rest of the fingerprints. It should be noted that if control circuitry 304 receives a different number of fingerprints for the first plurality and the second plurality, control circuitry 304 may discard the fingerprints that do not have a pair to match.

In some embodiments, control circuitry 304, when comparing the first fingerprint from the first plurality of fingerprints to the contemporaneous fingerprint stored in the log of fingerprints and comparing the second fingerprint from the second plurality of fingerprints to the contemporaneous fingerprint stored in the log of fingerprints, may first determine a time the first fingerprint from the first plurality of fingerprints was generated. For example, control circuitry 304 may retrieve generation times of fingerprints from the data structures described above which are stored in storage 308. Alternatively, control circuitry 304 may transmit a request to a remote server such as a server associated with media content source 416 or media guidance data source 418.

Control circuitry 304 may then search for the contemporaneous fingerprint by identifying a fingerprint in the log of fingerprints that was generated closest in time to the first fingerprint. For example, the log of fingerprints may be stored in a data structure similar to data structures that store fingerprints described above as part of FIG. 9. Control circuitry 304 may compare the generation time of the fingerprint from the first plurality of fingerprints with generation times of the fingerprints in the log. Control circuitry 304 may retrieve the fingerprint with the generation time closest to the generation time of the fingerprint from the first plurality of fingerprints as the contemporaneous fingerprint.

Control circuitry 304 may then compare both the first fingerprint and the second fingerprint with the contemporaneous fingerprint. When the contemporaneous fingerprint is identified, control circuitry 304 may compare the contemporaneous fingerprint with the divergent fingerprint from the first plurality of fingerprints and the fingerprint from the second plurality of fingerprints.

In some embodiments, control circuitry 304 may determine that the first fingerprint from the first plurality of fingerprints diverges from the second fingerprint from the second plurality of fingerprints by transmitting, to the server, a request to identify a first media asset corresponding to the first fingerprint. For example, control circuitry 304 may transmit to a server associated with media content source 416 or media guidance data source 418 a request to identify the first fingerprint. The server may access a database that contains a plurality of fingerprints and corresponding indications of media assets. For example, a database may contain a table of fingerprints and another table that includes indications of media assets. These indications may include titles, date of release, episode number where applicable, an identifier of the media asset, as well as other identifying information. Each fingerprint may be linked to a media asset in the table of indications of media assets. The server may compare the received fingerprint to each fingerprint in the table of fingerprints and when a match is found may retrieve a media asset identifier corresponding to the fingerprint that was matched.

Control circuitry 304 may transmit, to the server, a request to identify a second media asset corresponding to the second fingerprint. The same set of actions may be implemented in conjunction with identifying the second media asset as were implemented in conjunction with identifying the first media asset, above.

Control circuitry 304 may then compare a first media asset identifier corresponding to the first media asset and a second media asset identifier corresponding to the second media asset. For example, media asset identifiers that control circuitry 304 receives may be alphanumeric strings. They may also be titles, episode numbers, and years of release. A media content identifier in this case may be any set of information that uniquely identifies a media asset. Control circuitry 304 may, based on the comparing, determine that the first fingerprint diverges from the second fingerprint. If the two media identifiers do not match, then control circuitry may determine that the fingerprints diverge.

In some embodiments, the log of fingerprints is located on a device where the fingerprint generated based on the media content that the user is consuming at the given time is generated. For example, if control circuitry 304 generates fingerprints on a smart TV then the log of fingerprints is stored on that same smart TV.

In some aspects, control circuitry 304 may be configured to determine a source of content that the user is presently consuming by using content identifiers. In some embodiments, control circuitry 304 may periodically generate fingerprints based on media content that the user is consuming at a given time. Control circuitry 304 may generate fingerprints in the same manner as described above.

In some embodiments, control circuitry 304 may, for each fingerprint, determine a content identifier, where the content identifier corresponds to a respective media asset, and store, in a log, the content identifier and a timestamp, where the timestamp corresponds to a time that the fingerprint was generated. For example, control circuitry 304 may transmit a request, to a server, to identify a media asset that corresponds to the fingerprint. The request may include the fingerprint. Control circuitry 304 may transmit the request over a network, for example, the Internet. The server may be located at media content source 416 or media guidance data source 418 and may be accessed via communications network 414. In some embodiments, the server may be located in the viewer's home and may be communicating over communications network 414 with media content source 416 and/or media guidance data source 418.

When the server receives the request, control circuitry on the server may compare the fingerprint with fingerprints that are stored in the database described above. The database also includes corresponding media asset indications. Media asset indications have been described above in relation to fingerprints. When the server finds a match, it may transmit back a content identifier corresponding to the fingerprint's media asset. As referred to herein the term "content identifier" refers to any graphic and/or text that can uniquely identify a media asset. For example, a unique combination of alphanumeric characters may be used as a content identifier. Control circuitry 304 may then store the content identifier in the log.

In some embodiments, the log may be located on the same device as control circuitry 304. For example, the log may be stored in storage 308. Control circuitry 304 may access storage 308 and store the content identifier. In some embodiments, the log may be stored in a database. The database may include a table where the content identifiers are stored together with timestamps that represent fingerprint generation times for the corresponding fingerprints. In some embodiments, content identifiers may be stored in a file representing the log. For example, an XML file may be used to store the log.

In some embodiments, the log may be located at a server remote to the device where the control circuitry performs its tasks. For example, the log may be stored at media content source 416 or at media guidance data source 418. The server may store log files for a plurality of devices that are connected to the system described. As described above, each log file may be identified by a device identifier or a network address. In some embodiments, only devices with a corresponding device identifier or network address may be allowed access to the corresponding log file.

In some embodiments, the log may be located on a server at the viewer's home. All devices at the viewer's home may be storing corresponding log files on the server. As described above, the server may store different logs the same way as control circuitry 304 stores the log in storage 308. For example, the log may be stored in an XML file, a database, or any other storage method.

In some embodiments, control circuitry 304 may transmit to a server a request to identify a content source corresponding to a media asset, where the media asset is consumed by the user at a first time, and where the request comprises a fingerprint generated at the first time based on the media asset. Control circuitry 304 may perform the transmission in the same ways as described above in relation to transmitting a request to identify a content source based on a fingerprint.

In some embodiments, control circuitry 304 may receive, from the server, a first content source identifier and a second content source identifier, where the first content source identifier and the second content source identifier correspond to a first content source and a second content source, respectively, that are both transmitting the media asset at the first time. The processes of receiving the first content source identifier and the second source identifier may be the same as described above.

In some embodiments, control circuitry 304 may transmit, to the server, a request for a first plurality of content identifiers and corresponding timestamps and a second plurality of content identifiers and corresponding timestamps, where the first plurality of content identifiers and the second plurality of content identifiers correspond to content transmitted by the first content source and by the second content source, respectively. Control circuitry 304 may transmit the request in the same manner as described above in relation to transmitting a request for a first plurality of fingerprints and a second plurality of fingerprints. The request in this case includes a request for the corresponding timestamps.

In some embodiments, control circuitry 304 may, in response to receiving the first plurality of content identifiers and the second plurality of content identifiers, match each content identifier from the first plurality of content identifiers with a content identifier from the second plurality of content identifiers to create a plurality of matched pairs of content identifiers, where the matching is performed based on a timestamp associated with the respective content identifiers. Control circuitry 304 may perform the matching in any of the ways described above in relation to matching fingerprints based on time. In this instance, control circuitry 304 may match content identifiers based on the timestamps which correspond to matching fingerprints by time.

In some embodiments, control circuitry 304 may iterate through each matched pair of content identifiers in reverse chronological order until a first content identifier from the first plurality of content identifiers diverges from a second content identifier from the second plurality of content identifiers, where the iterating comprises comparing each content identifier from the first plurality of content identifiers with a matched content identifier from the second plurality of content identifiers. Control circuitry 304 may perform the iterating in any of the ways as described above in relation to iterating through fingerprints. Instead of comparing fingerprints, control circuitry 304 may compare content identifiers. For example, if content identifiers are alphanumeric strings, the comparison may be a character-by-character comparison of the string.

In some embodiments, control circuitry 304 may compare the first content identifier from the first plurality of content identifiers to a contemporaneous content identifier stored in the log and compare the second content identifier from the second plurality of content identifiers to the contemporaneous content identifier stored in the log. Control circuitry 304 may perform the comparison in order to determine whether the first content identifier from the first plurality of content identifiers or the second content identifier from the second plurality of content identifiers matches the contemporaneous content identifier from the log. For example, control circuitry 304 may use a one-by-one character comparison while comparing the content identifiers.

In some embodiments, control circuitry 304 may determine whether the first content source or the second content source is a source of content that the user is presently consuming based on whether the first content identifier from the first plurality of content identifiers or the second content identifier from the second plurality of content identifiers matches the contemporaneous content identifier from the log. For example, control circuitry 304 may store a content source identifier corresponding to the content source that has been determined as the content source that the user is consuming content from in storage 308.

In some embodiments, where the log is stored on a device that is different from the device where control circuitry 304 resides, control circuitry 304, when comparing the first content identifier from the first plurality of content identifiers to the contemporaneous content identifier stored in the log and comparing the second content identifier from the second plurality of content identifiers to the contemporaneous content identifier stored in the log, may first transmit, to the second device, a request for the contemporaneous content identifier, where the request comprises a timestamp associated with the first content identifier. This transmission may be performed in the same manner as in relation to transmitting a request for the contemporaneous fingerprint. However, instead of transmitting a time of generation, control circuitry 304 may transmit the timestamp corresponding to the appropriate content identifier.

Control circuitry 304 may then receive, from the remote server, the contemporaneous content identifier, where the contemporaneous content identifier corresponds to a timestamp closer in time to the timestamp of the first content identifier than to a timestamp of any other content identifier in the log. The same process may be used to determine the appropriate content identifier to send to the device where control circuitry 304 resides as in relation to receiving a fingerprint as described above. However, instead of using generation times, control circuitry 304 may use timestamps in the process.

Figure 9:
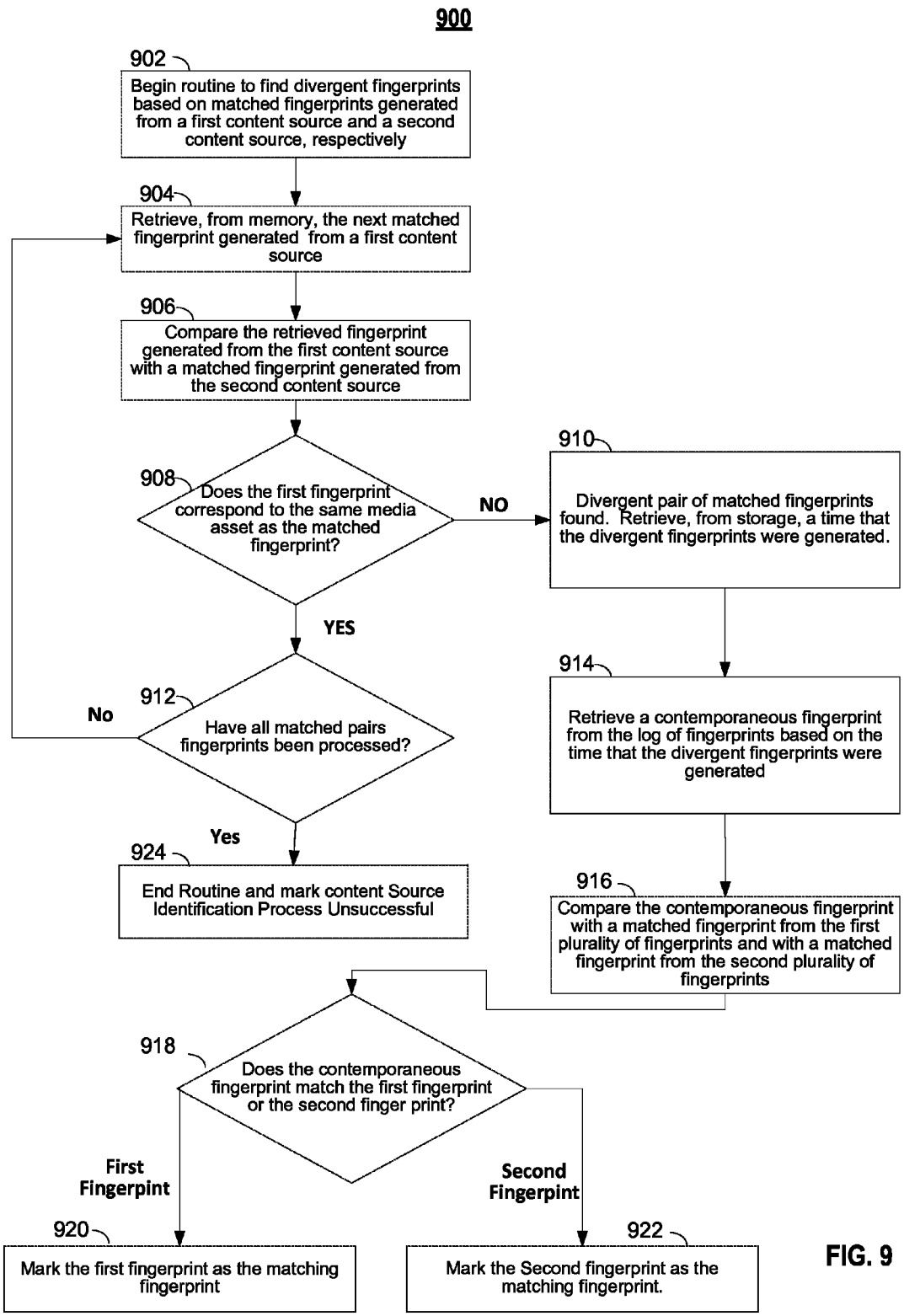
FIG. 9 depicts illustrative processes involved in finding divergent fingerprints based on matched fingerprints generated from a first content source and a second content source, respectively, in accordance with some embodiments of this disclosure.

In some embodiments, control circuitry 304, when matching each content identifier from the first plurality of content identifiers with the content identifier from the second plurality of content identifiers to create the plurality of matched pairs of content identifiers, may index the first plurality of content identifiers and the second plurality of content identifiers by time based on respective timestamps. Control circuitry 304 may perform the indexing in the same manner as described above, in relation to indexing fingerprints. In FIG. 9 items 906 and 916 may represent content identifiers and items 904 and 918 may represent timestamps. Data structures 902 and 914 may store timestamps and content identifiers. Index 908 may represent an index of times or time ranges 910 as described above. Links 912 may link appropriate content identifiers as a matched pair, as described above in relation to matching and indexing fingerprints.

In some embodiments, control circuitry 304, when matching each content identifier from the first plurality of content identifiers with the content identifier from the second plurality of content identifiers to create the plurality of matched pairs of content identifiers, may sort the first plurality of content identifiers in reverse chronological order based on respective timestamps corresponding to content identifiers of the first plurality of content identifiers. Control circuitry 304 may also sort the second plurality of content identifiers in reverse chronological order based on respective timestamps corresponding to content identifiers of the second plurality of content identifiers. Control circuitry 304 may perform the sorting operation in the same manner as sorting fingerprints, as described above.

Control circuitry 304 may then match each content identifier from the first plurality of content identifiers with a corresponding content identifier from the second plurality of content identifiers according to the sorting order. Control circuitry 304 may perform the matching of sorted content identifiers in the same way or ways as matching sorted fingerprints.

In some embodiments, control circuitry 304, when comparing the first content identifier from the first plurality of content identifiers to the contemporaneous content identifier stored in the log and comparing the second content identifier from the second plurality of content identifiers to the contemporaneous content identifier stored in the log, may determine a timestamp corresponding to the first content identifier from the first plurality of content identifiers. For example, control circuitry 304 may retrieve the timestamp from storage 308. If content identifiers and timestamps are stored in a data structure, control circuitry 304 may access the data structure in storage 308 and retrieve the appropriate time stamp.

Control circuitry 304 may then search for the contemporaneous content identifier by identifying a content identifier in the log that corresponds to a timestamp closer in time to the timestamp of the first content identifier than to a timestamp of any other content identifier in the log. Control circuitry 304 may perform the search in the same manner as searching for a contemporaneous fingerprint based on generation time, described above. Control circuitry 304 may then compare both the first content identifier and the second content identifier with the contemporaneous content identifier.

In some embodiments, control circuitry 304 may fingerprint a media asset that has not been fingerprinted before. For example, when a new episode of a show is shown for a first time, the new episode has not been fingerprinted in the past. As a result, control circuitry 304 may add the new episode to a database of known media assets that have corresponding fingerprints and content identifiers. In order to add the new episode to a database of known media assets, control circuitry 304 may generate a fingerprint based on media content being transmitted. Control circuitry 304 may then identify a media asset corresponding to the media fingerprint by cross-referencing a time the fingerprint was generated and a content source corresponding to the media fingerprint with scheduling data. For example, control circuitry 304 may search a through scheduling data available to a media guidance application for the identity of the media asset using the time the fingerprint was generated and an identity of the content source based on which the fingerprint was generated as search parameters.

Control circuitry 304 may then perform a search for the media asset in a database that stores media asset identifiers and corresponding content identifiers. Control circuitry 304 performs this search to confirm that the media asset does not have a content identifier assigned to it already. Control circuitry 304 may perform a search transmitting a database query to a database that includes the media asset identifier as a search parameter. In some embodiments, control circuitry 304 may, based on the search returning no results, generate a content identifier for the media asset corresponding to the media fingerprint. If the media asset does not have a corresponding content identifier, control circuitry 304 may generate one for the media asset. Alternatively, control circuitry 304 may request that a server that stores the database generate a content identifier for the media asset.

In some embodiments, the whole process of identifying content sources may be completed at a server and not on the device that generates the fingerprints. When the device where control circuitry 304 resides generates the fingerprint, the fingerprint may be sent to a server and a server may take over processing. This includes storing the fingerprints and content identifiers, storing fingerprint logs and content identifier logs, and processing all the determination processes. The device where control circuitry 304 resides may receive the end result of the execution of the process, which may include a source identifier of the content source that the viewer is consuming content on.

FIGS. 5 and 6 present an algorithm for control circuitry (e.g., control circuitry 304) to determine whether the first content source or the second content source is a source of content that the user is presently consuming in accordance with some embodiments of the disclosure. In some embodiments this algorithm may be encoded onto a non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

The flowchart in FIG. 5 describes an algorithm for control circuitry (e.g., control circuitry 304) to determine whether the first content source or the second content source is a source of content that the user is presently consuming in accordance with some embodiments of the disclosure.

At 502, the algorithm to determine whether the first content source or the second content source is a source of content that the user is presently consuming will begin based on whether the first content identifier from the first plurality of content identifiers or the second content identifier from the second plurality of content identifiers matches the contemporaneous content identifier from the log. In some embodiments, this may be done either directly or indirectly in response to a user action or input (e.g., from signals received by control circuitry 304 or user input interface 310). For example, the algorithm may begin directly in response to control circuitry 304 receiving signals from user input interface 310, or control circuitry 304 may prompt the user to confirm his/her input using a display (e.g., by generating a prompt to be displayed on display 312) prior to running the algorithm.

At 504, control circuitry 304 proceeds to retrieve the first content identifier from memory. In some embodiments control circuitry 304 may receive a single primitive data structure that represents the first content identifier. In some embodiments, the first content identifier may be stored as part of a larger data structure, and control circuitry 304 may retrieve the first content identifier by executing appropriate accessor methods to retrieve the value from the larger data structure.

At 506, control circuitry 304 proceeds to compare the first content identifier to a contemporaneous content identifier stored in a log. In some embodiments, the contemporaneous content identifier may be stored (e.g., on storage device 308) prior to beginning the algorithm. In some embodiments, control circuitry 304 may directly compare the contemporaneous content identifier with the first content identifier by accessing the values respectively from memory and performing a value comparison. In some instances, control circuitry 304 may call a comparison function (e.g., for object to object comparison) to compare the first content identifier and the contemporaneous content identifier.

At 508, control circuitry 304 determines whether the first content identifier matches the contemporaneous content identifier. If the condition is satisfied, the algorithm may proceed to 510; if the condition is not satisfied, the algorithm may proceed to 512 instead.

At 510, control circuitry 304 executes a subroutine to indicate that the first content source is the content source that the viewer is consuming content from, based on the condition at 508 being satisfied.

At 512, control circuitry 304 compares the second content identifier and the contemporaneous content identifier to determine whether the second content identifier matches the contemporaneous content identifier.

At 514, control circuitry 304 determines whether the second content identifier matches the contemporaneous content identifier. If the condition is satisfied, the algorithm may proceed to 516; if the condition is not satisfied, the algorithm may proceed to 518 instead.

At 516, control circuitry 304 executes a subroutine to indicate that the second content source is the content source that the viewer is consuming content from.

At 518, control circuitry 304 executes a subroutine to indicate that content source identification has failed.

It is contemplated that the descriptions of FIG. 5 may be used with any other embodiment of this disclosure. In addition, the descriptions described in relation to the algorithm of FIG. 5 may be done in alternative orders or in parallel to further the purposes of this disclosure. For example, conditional statements and logical evaluations, such as those at 508 and 514, may be performed in any order or in parallel or simultaneously to reduce lag or increase the speed of the system or method. Furthermore, it should be noted that the algorithm of FIG. 5 may be implemented on a combination of appropriately configured software and hardware, and that any of the devices or equipment discussed in relation to FIGS. 3-4 could be used to implement one or more portions of the algorithm.

The pseudocode in FIG. 6 describes an algorithm to determine whether the first content source or the second content source is a source of content that the user is presently consuming based on whether the first content identifier from the first plurality of content identifiers or the second content identifier from the second plurality of content identifiers matches the contemporaneous content identifier from the log in accordance with some embodiments of the disclosure. It will be evident to one skilled in the art that the algorithm described by the pseudocode in FIG. 6 may be implemented in any number of programming languages and a variety of different hardware, and that the style and format should not be construed as limiting, but rather as a general template of the actions and procedures that would be consistent with code used to implement some embodiments of this disclosure.

At line 601, the algorithm may run a subroutine to initialize variables and prepare to determine whether the first content source or the second content source is a source of content that the user is presently consuming based on whether the first content identifier from the first plurality of content identifiers or the second content identifier from the second plurality of content identifiers matches the contemporaneous content identifier from the log, which begins on line 605. For example, in some embodiments control circuitry 304 may retrieve the first content identifier and the second content identifier from a storage medium (e.g., storage device 308) into RAM or into the cache for processing circuitry 306 during the initialization stage. Additionally, in some embodiments the contemporaneous content identifier being used for comparison, or a tolerance level for determining if two values are essentially equivalent, may be retrieved, set, and stored at 601.

At line 605, control circuitry 304 may receive the first content identifier. In some embodiments these instances may be retrieved from storage 308. In another example, control circuitry 304 may receive an object of a class, such as an iterator object containing the first content identifier.

At line 606, control circuitry 304 may receive the second content identifier in the same manner as the first content identifier.

At line 607, control circuitry 304 receives the second content identifier in the same manner as the first content identifier.

At line 608, control circuitry 304 compares the first content identifier to the contemporaneous content identifier to see if they are identical.

At line 609, control circuitry 304 executes a subroutine to indicate that the first content source is the content source that the viewer is consuming using control circuitry using processing circuitry 306 if the condition in line 609 is satisfied.

At line 610, control circuitry 304 compares the second content identifier to the contemporaneous content identifier. This comparison is essentially performed in the same manner as the comparison at line 608.

At line 611, control circuitry 304 will execute a subroutine to indicate that the first content source is the content source that the viewer is consuming using control circuitry 306 if the condition in line 610 is satisfied.

At line 613, control circuitry 304 determines that neither condition in line 608 or 610 is satisfied. If neither condition is satisfied, then the instruction at line 613 may be evaluated and executed.

At line 613, control circuitry 304 will execute a subroutine to indicate that the content source identification failed using control circuitry using processing circuitry 306 if neither of the conditions at lines 608 or 610 are satisfied.

At line 615, control circuitry 304 may run a termination subroutine after the algorithm has performed its function. For example, in some embodiments control circuitry 304 may destruct variables, perform garbage collection, free memory or clear the cache of processing circuitry 306.

It will be evident to one skilled in the art that the algorithm described by the pseudocode in FIG. 6 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments break conditions may be placed after lines 609 and 611 to speed operation, or the conditional statements may be replaced with a case-switch.

Figure 7:
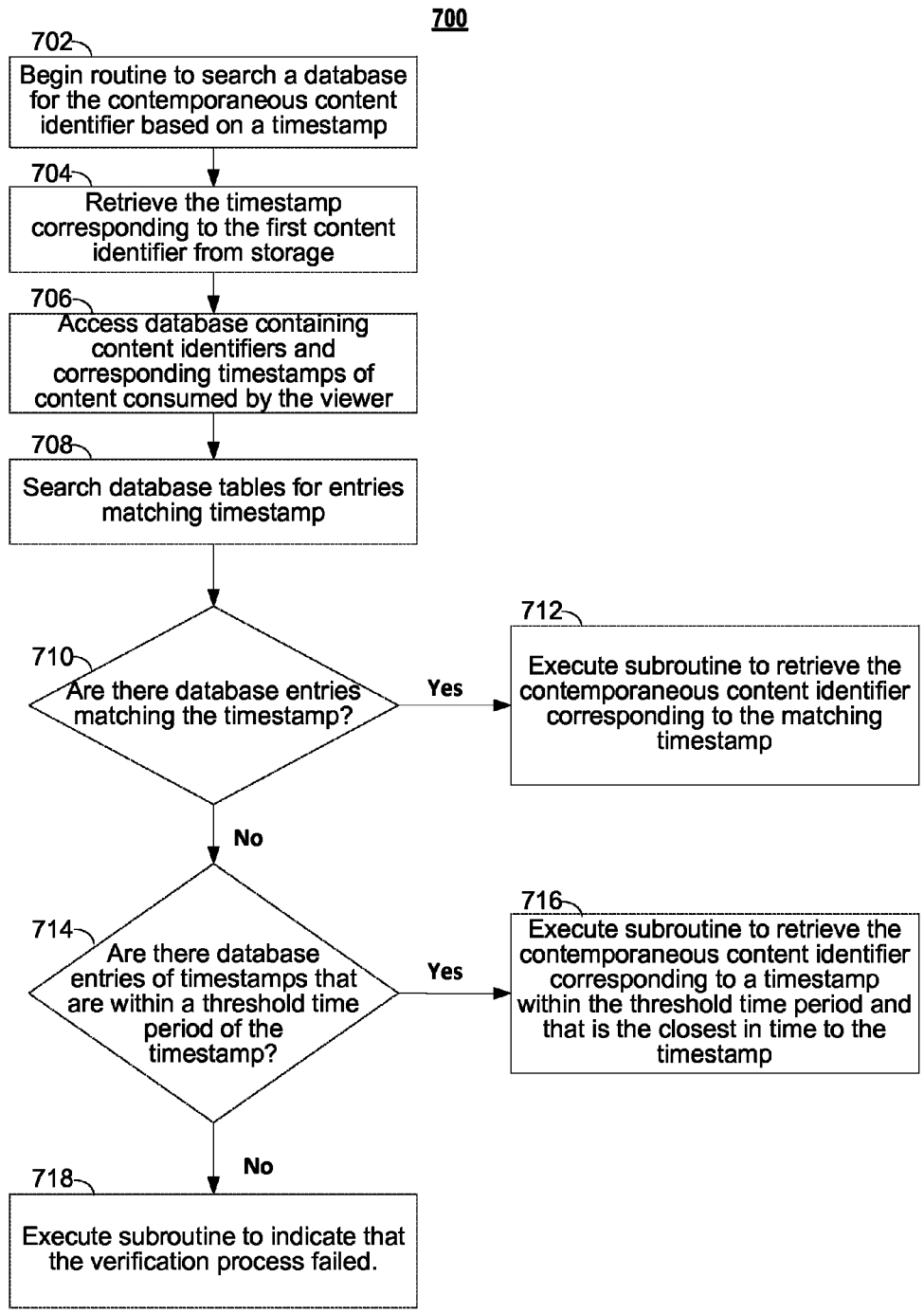
FIG. 7 depicts illustrative processes involved in searching a database for the contemporaneous content identifier based on a timestamp, in accordance with some embodiments of this disclosure.

FIGS. 7 and 8 present an algorithm for control circuitry (e.g., control circuitry 304) to search a database for the contemporaneous content identifier based on a timestamp using a database containing a log of content identifiers in accordance with some embodiments of the disclosure. Similar to the algorithms described by FIGS. 5 and 6, in some embodiments this algorithm may be encoded onto a non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

The flowchart in FIG. 7 describes an algorithm for control circuitry (e.g., control circuitry 304) to search a database and for the contemporaneous content identifier based on a timestamp in accordance with some embodiments of the disclosure.

At 702, the algorithm to search a database for the contemporaneous content identifier based on a timestamp begins based on a divergent pair of fingerprints being determined. In some embodiments, this may be done either directly or indirectly in response to a user action or input (e.g., from signals received by control circuitry 304 or user input interface 310.)

At 704, control circuitry 304 proceeds to retrieve the timestamp corresponding to the first content identifier from storage 308. In some embodiments control circuitry 304 may retrieve a single primitive data structure that represents the value of the timestamp. In some embodiments control circuitry 304 may retrieve the value from a larger class or data structure.

At 706, control circuitry 304 accesses a database containing a log of content identifiers and corresponding timestamps. In some embodiments, this database may be stored locally (e.g., on storage device 308) prior to beginning the algorithm. In some embodiments the database may also be accessed by using communications circuitry to transmit information across a communications network (e.g., communications network 414) to a database implemented on a remote storage device (e.g., media guidance data source 418).

At 708, control circuitry 304 searches database tables for entries matching the timestamp. In some embodiments this may be done by comparing an identifier, for example a string or integer representing the timestamp, that matches the types of identifiers used inside the database. In some embodiments control circuitry 304 may submit a general query to the database for table entries matching the timestamp, and control circuitry 304 may receive a list of indices or a data structure containing a portion of the database contents. In some embodiments the database may implement a junction table that in turn cross-references entries from other databases. In this case, control circuitry 304 may retrieve indices from a first database that in turn can be used to retrieve information from a second database. Although we may describe control circuitry 304 interacting with a single database for purposes of clarity, it is understood that the algorithm of FIG. 7 may be implemented using multiple independent or cross-referenced databases.

At 710, control circuitry 304 may determine whether there are database entries matching the timestamp. In some embodiments control circuitry 304 may receive a signal from the database indicating that there are no matching entries. In some embodiments control circuitry 304 may instead receive a list of indices or data structures with a NULL or dummy value. If control circuitry 304 identifies that there is a database entry matching the timestamp, the algorithm proceeds to 712, otherwise the algorithm proceeds to 714.

At 712, control circuitry 304 executes a subroutine to retrieve the contemporaneous content identifier corresponding to the matching timestamp.

At 714, control circuitry 304 may determine whether there are database entries with timestamps close in time to the timestamp of the first content identifier. For example, in some embodiments, a threshold time value may be programmed into a search that would correspond to an acceptable content identifier. If control circuitry 304 identifies that there are timestamps in the database close in time to the timestamp of the first content identifier, the algorithm proceeds to 716; otherwise the algorithm proceeds to 718.

At 716, control circuitry 304 will execute a subroutine to retrieve the contemporaneous content identifier corresponding to a timestamp within the threshold time period and that is the closest in time to the timestamp.

At 718, control circuitry 304 will execute a subroutine to indicate that the verification process failed after determining that there were no matching database entries for the timestamp or close in time to the timestamp.

It is contemplated that the descriptions of FIG. 7 may be used with any other embodiment of this disclosure. In addition, the descriptions described in relation to the algorithm of FIG. 7 may be done in alternative orders or in parallel to further the purposes of this disclosure. For example, control circuitry 304 may submit multiple queries to the database in parallel, or it may submit multiple queries to a plurality of similar databases in order to reduce lag and speed the execution of the algorithm. As a further example, although 712 and 716 are described as being mutually exclusive, both exact entries and similar entries may be processed for a single timestamp. To further this purpose, in some embodiments 710 and 714 may be performed in parallel by control circuitry 304. Furthermore, it should be noted that the algorithm of FIG. 7 may be implemented on a combination of appropriately configured software and hardware, and that any of the devices or equipment discussed in relation to FIGS. 3-4 could be used to implement one or more portions of the algorithm.

The pseudocode in FIG. 8 describes an algorithm to search a database for the contemporaneous content identifier based on a timestamp in accordance with some embodiments of the disclosure. It will be evident to one skilled in the art that the algorithm described by the pseudocode in FIG. 8 may be implemented in any number of programming languages and a variety of different hardware, and that the style and format should not be construed as limiting, but rather as a general template of the actions and procedures that would be consistent with code used to implement some embodiments of this disclosure.

At line 801, the algorithm may run a subroutine to initialize variables and prepare to search a database for the contemporaneous content identifier based on a timestamp, which begins on line 805. For example, in some embodiments control circuitry 304 may copy instructions from a non-transitory storage medium (e.g., storage device 308) into RAM or into the cache for processing circuitry 306 during the initialization stage.

At line 805, control circuitry 304 may receive a timestamp corresponding to the first content identifier. In some embodiments the timestamp may be retrieved from storage 308.

At line 807, control circuitry 304 may query a database for entries matching the timestamp. Depending on how the database is implemented and how the timestamp is stored, an intermittent action may be required to convert the timestamp into a form consistent with the database. For example, the timestamp may be encoded into a string or an integer using an appropriate hashing algorithm prior to being transmitted to the database by control circuitry 304 as part of a query. In some embodiments the timestamp may be encoded as a primitive data structure, and control circuitry 304 may submit the timestamp as a query to the database directly. After querying the database, control circuitry 304 may receive a database entry matching the timestamp. In some embodiments control circuitry 304 may receive the entry in the form of a data structure, a set of indices of the database, or a set of indices of another cross-referenced database.

At line 808, control circuitry 304 determines whether there is a database entry matching the timestamp. In some embodiments control circuitry 304 may determine this by checking if the database returned an empty data structure or a NULL value in response to the query in line 807. If there is a matching database entry the algorithm may proceed to line 809. If there were no matching database entries the algorithm may instead proceed to line 811.

At line 809, control circuitry 304 may retrieve from the database the entry matching the timestamp. For example, if control circuitry 304 retrieves an index after querying the database in line 807, in some embodiments control circuitry 304 may retrieve the database entry matching the timestamp located at the received index. In some embodiments the index may point to a larger data structure contained within the database, and control circuitry 304 may retrieve the database entry from within the data structure using appropriate accessor methods. In some embodiments control circuitry 304 may retrieve the database entry and store it in a separate data structure locally (e.g., in storage 308) prior to proceeding further. After retrieving the database entry the algorithm proceeds to line 810.

At line 810, control circuitry 304 will execute a subroutine to retrieve, from the database entry, the contemporaneous content identifier corresponding to the matching timestamp using processing circuitry. Afterwards, the algorithm may proceed to line 815.

At line 811, control circuitry 304 may determine whether there are any database entries similar to the timestamp. For example, the timestamp may be represented by an object of a class. Control circuitry 304 may call a function to perform a fuzzy comparison (e.g., a comparison to identify similar time entries) by adding a pre-configured threshold time to the timestamp and also subtracting the pre-configured threshold time from the timestamp. If database entries similar to the timestamp are found by control circuitry 304 then the algorithm proceeds to line 812. If control circuitry 304 does not find matching entries (e.g., a query to the database returns a NULL value), the algorithm proceeds to line 812.

At line 812, control circuitry 304 executes a subroutine to retrieve the contemporaneous content identifier corresponding to a timestamp within the threshold time period and that is the closest in time to the timestamp using processing circuitry. Afterwards, the algorithm may proceed to line 815.

At line 811, control circuitry 304 will have determined that there were no database entries matching the timestamp. In this case, the algorithm proceeds to line 812.

At line 812, control circuitry 304 executes a subroutine to retrieve the contemporaneous content identifier corresponding to a timestamp within the threshold time period and that is the closest in time to the timestamp using processing circuitry using processing circuitry 306. Afterwards, the algorithm may proceed to line 814.

At line 814, control circuitry 304 executes a subroutine to indicate that the verification process failed using processing circuitry 306 based on neither of the conditions at lines 808 or 811 being satisfied.

At line 815, control circuitry 304 will execute a subroutine to indicate that the verification process failed using processing circuitry 306. Afterwards, the algorithm may proceed to the termination subroutine at line 817.

At line 817, control circuitry 304 may execute a termination subroutine after the algorithm has performed its function. For example, in some embodiments control circuitry 304 may destruct variables, perform garbage collection, free memory or clear the cache of processing circuitry 306.

It will be evident to one skilled in the art that the algorithm described by the pseudocode in FIG. 8 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. It is also understood that although we may describe control circuitry 304 interacting with a single database, this is only a single embodiment described for illustrative purposes, and the algorithm of FIG. 8 may be implemented using multiple independent or cross-referenced databases. For example, a database stored locally (e.g., on storage 308) may index or cross-reference a database stored remotely (e.g., media guidance data source 418), which may be accessible through any number of communication channels (e.g., communications network 414). In some embodiments, this may allow control circuitry 304 to utilize a look-up table or database front-end efficiently stored on a small local drive to access a larger database stored on a remote server on demand.

FIG. 9 depicts illustrative processes involved in routine to find divergent fingerprints based on matched fingerprints generated from a first content source and a second content source, respectively. It should be noted that process 900 or any action thereof could be performed on, or provided by, any of the devices shown in FIGS. 3-4. For example, process 900 may be executed by control circuitry 304 (FIG. 3) as instructed by a media guidance application implemented on user equipment 402, 404, and/or 406 (FIG. 4) in order to distribute control of media guidance application operations for a target device among multiple user devices. In addition, one or more actions of process 900 may be incorporated into or combined with one or more actions of any other process or embodiment (e.g., process 500 (FIG. 5), 700 (FIG. 7), etc.).

At 902, control circuitry 304 begins a routine to find divergent fingerprints based on matched fingerprints generated from a first content source and a second content source, respectively.

At 904, control circuitry 304 retrieves from memory the next matched fingerprint generated from a first content source. For example, control circuitry 304 may retrieve the matched fingerprint from storage 308, from media content source 416, or from media guidance data source 418.

At 906, control circuitry 304 compares the retrieved fingerprint generated from the first content source with a matched fingerprint generated from the second content source. Means of comparison may be consistent with any means described above.

At 908, control circuitry 304 determines whether the first fingerprint corresponds to the same media asset as its matched fingerprint. If control circuitry 304 determines that the first fingerprint does not correspond to the same media asset as its matched fingerprint, the process moves to 910. If control circuitry 304 determines that the first fingerprint does not correspond to the same media asset as its matching fingerprint, the process moves to 912.

At 910, control circuitry 304 retrieves, from storage, a time that the divergent fingerprints were generated. Control circuitry 304 may retrieve the time from storage 308.

At 914, control circuitry 304 retrieves a contemporaneous fingerprint from the log of fingerprints based on the time that the divergent fingerprints were generated. Means of retrieval may be consistent with any means described above.

At 916, control circuitry 304 compares the contemporaneous fingerprint with a matched fingerprint from the first plurality of fingerprints and with a matched fingerprint from the second plurality of fingerprints. Means of comparison may be consistent with any means described above.

At 918, control circuitry 304 determines whether the contemporaneous fingerprint matches the first fingerprint or the second finger print. Examples of this determination have been described above. If control circuitry 304 determines that the contemporaneous fingerprint matches the first fingerprint, process 900 moves to 920. If control circuitry 304 determines that the contemporaneous fingerprint matches the second fingerprint, process 900 moves to 922.

At 920, control circuitry 304 marks the first fingerprint as a matching fingerprint. For example, control circuitry 304 may create a variable in storage 308 to represent the matching fingerprint and link the variable to the first fingerprint.

At 922, control circuitry 304, marks the second fingerprint as a matching fingerprint. For example, control circuitry 304 may create a variable in storage 308 to represent the matching fingerprint and link the variable to the second fingerprint.

At 912, control circuitry 304 determines whether all matched pairs of fingerprints have been processed. If control circuitry 304 determines that all matched pairs of fingerprints have been processed, process 900 moves to 924. If control circuitry 304 determines that not all matched pairs of fingerprints have been processed, process 900 moves to 904.

At 924, process 900 ends and control circuitry 304 marks the content source identification process unsuccessful. For example, control circuitry 304 may return an error to an error log or alert the viewer to the failure.

It is contemplated that the actions or descriptions of FIG. 9 may be used with any other embodiment of this disclosure. In addition, the actions and descriptions described in relation to FIG. 9 may be done in alternative orders or in parallel to further the purposes of this disclosure. For example, each of these actions may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 9.

Figure 10:
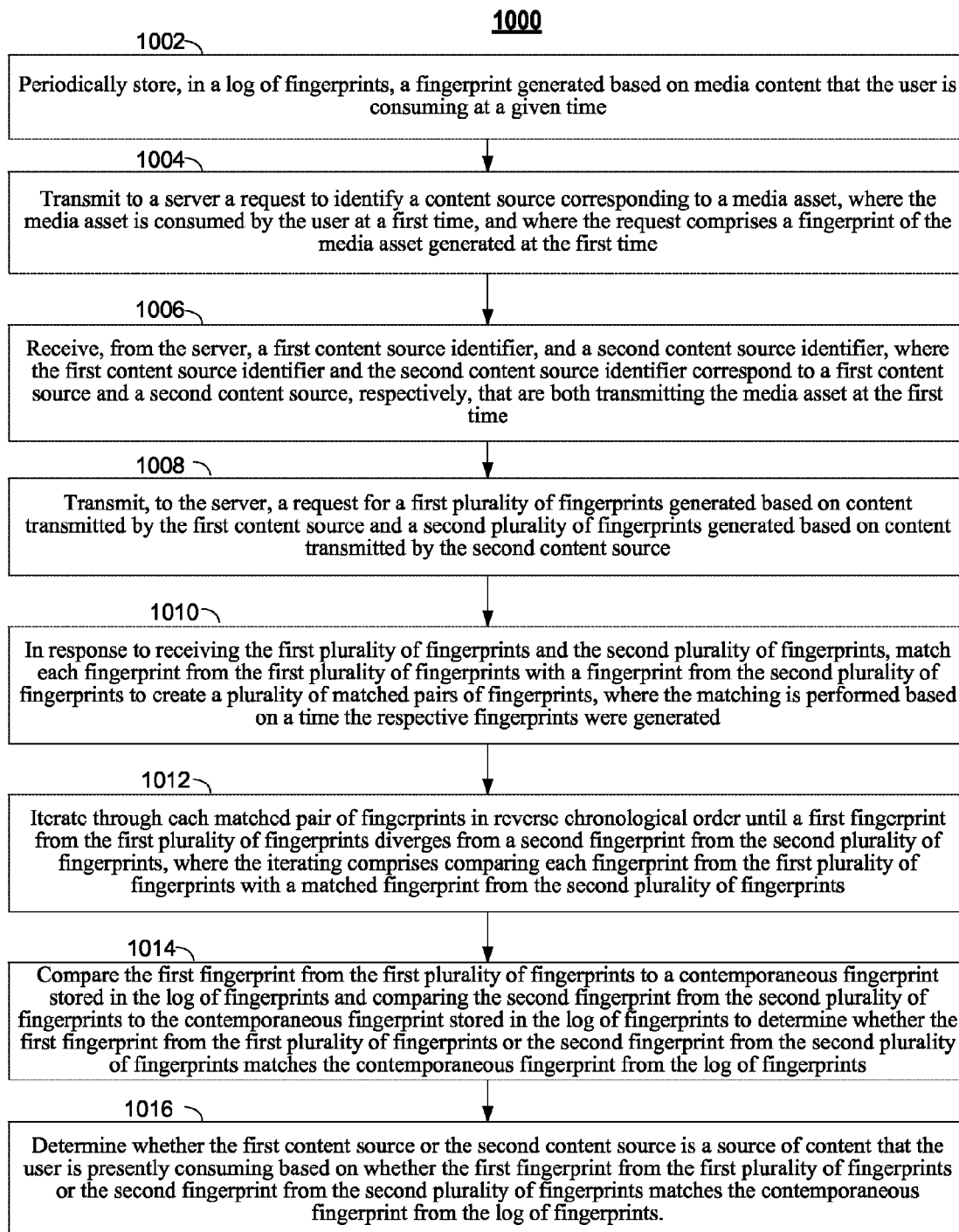
FIG. 10 depicts illustrative processes involved in determining the source of content that a viewer is consuming based on fingerprints of the content, in accordance with some embodiments of this disclosure.

FIG. 10 depicts illustrative processes involved in determining the source of content that a viewer is consuming based on fingerprints of the content. It should be noted that process 1000 or any action thereof could be performed on, or provided by, any of the devices shown in FIGS. 3-4. For example, process 1000 may be executed by control circuitry 304 (FIG. 3) as instructed by a media guidance application implemented on user equipment 402, 404, and/or 406 (FIG. 4) in order to distribute control of media guidance application operations for a target device among multiple user devices. In addition, one or more actions of process 1000 may be incorporated into or combined with one or more actions of any other process or embodiment (e.g., process 700 (FIG. 7)).

At 1002, control circuitry 304 periodically stores, in a log of fingerprints, a fingerprint generated based on media content that the user is consuming at a given time. Means of storing a fingerprint may be consistent with any means described above.

At 1004, control circuitry 304 transmits to a server a request to identify a content source corresponding to a media asset, where the media asset is consumed by the user at a first time, and where the request comprises a fingerprint of the media asset generated at the first time. Means of transmitting may be consistent with any means described above.

At 1006, control circuitry 304 receives, from the server, a first content source identifier and a second content source identifier, where the first content source identifier and the second content source identifier correspond to a first content source and a second content source, respectively, that are both transmitting the media asset at the first time. Means of receiving may be consistent with any means described above.

At 1008, control circuitry 304 transmits, to the server, a request for a first plurality of fingerprints generated based on content transmitted by the first content source and a second plurality of fingerprints generated based on content transmitted by the second content source. Means of transmitting may be consistent with any means described above.

At 1010, control circuitry 304, in response to receiving the first plurality of fingerprints and the second plurality of fingerprints, matches each fingerprint from the first plurality of fingerprints with a fingerprint from the second plurality of fingerprints to create a plurality of matched pairs of fingerprints, where the matching is performed based on a time the respective fingerprints were generated. Means of matching may be consistent with any means described above.

At 1012, control circuitry 304 iterates through each matched pair of fingerprints in reverse chronological order until a first fingerprint from the first plurality of fingerprints diverges from a second fingerprint from the second plurality of fingerprints, where the iterating comprises comparing each fingerprint from the first plurality of fingerprints with a matched fingerprint from the second plurality of fingerprints. Means of iterating may be consistent with any means described above.

At 1014, control circuitry 304 compares the first fingerprint from the first plurality of fingerprints to a contemporaneous fingerprint stored in the log of fingerprints and compares the second fingerprint from the second plurality of fingerprints to the contemporaneous fingerprint stored in the log of fingerprints to determine whether the first fingerprint from the first plurality of fingerprints or the second fingerprint from the second plurality of fingerprints matches the contemporaneous fingerprint from the log of fingerprints. Means of comparing may be consistent with any means described above.

At 1016, control circuitry 304 determines whether the first content source or the second content source is a source of content that the user is presently consuming based on whether the first fingerprint from the first plurality of fingerprints or the second fingerprint from the second plurality of fingerprints matches the contemporaneous fingerprint from the log of fingerprints. Means of determining may be consistent with any means described above.

It is contemplated that the actions or descriptions of FIG. 10 may be used with any other embodiment of this disclosure. In addition, the actions and descriptions described in relation to FIG. 10 may be done in alternative orders or in parallel to further the purposes of this disclosure. For example, each of these actions may be performed in any order or in parallel or substantially simultaneously to reduce lag or increase the speed of the system or method. Furthermore, it should be noted that any of the devices or equipment discussed in relation to FIGS. 3-4 could be used to perform one or more of the actions in FIG. 10.

Figure 11:
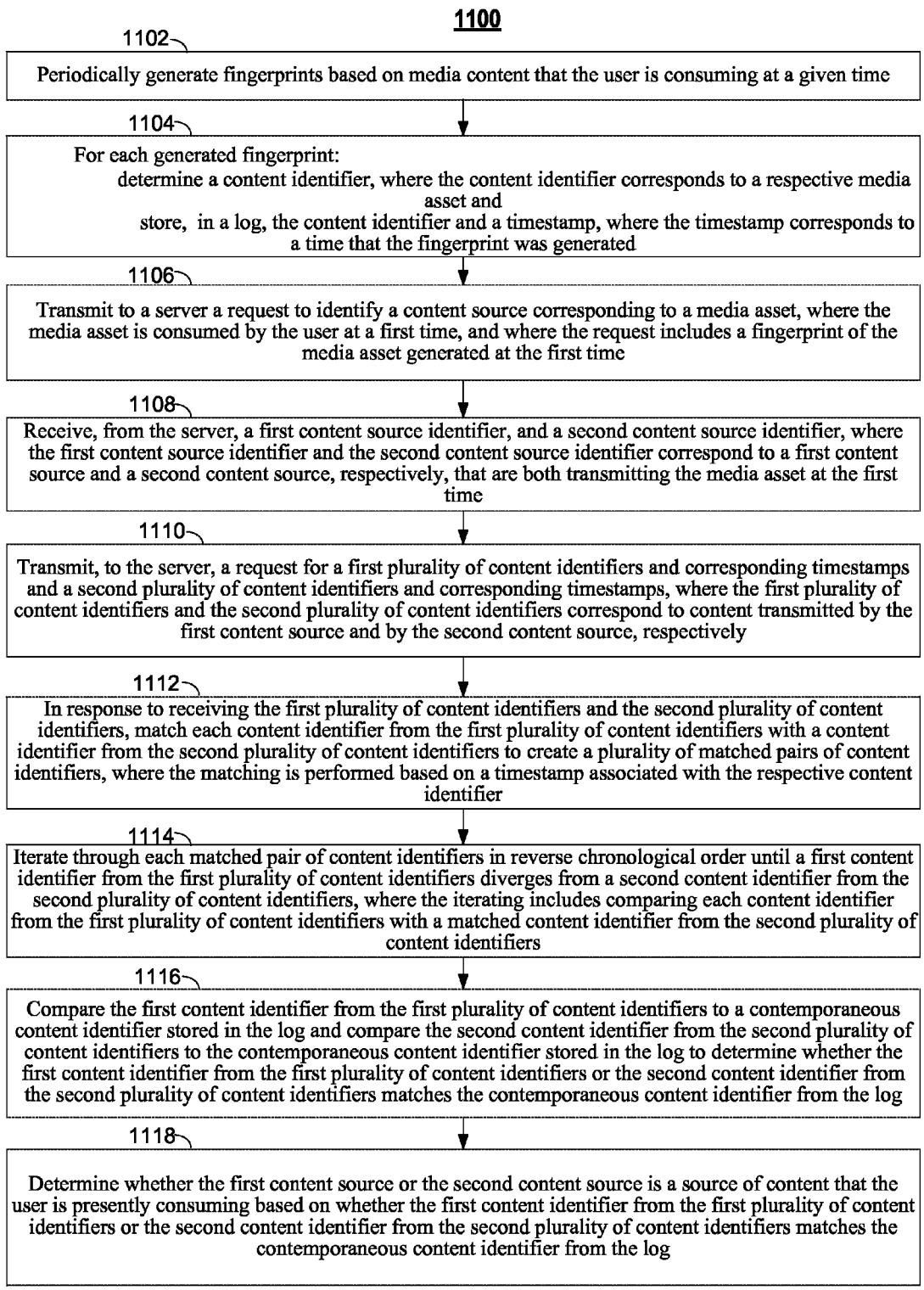
FIG. 11 depicts illustrative processes involved in determining the source of content that a viewer is consuming based on fingerprints of the content, in accordance with some embodiments of this disclosure.

FIG. 11 depicts illustrative processes involved in determining the source of content that a viewer is consuming based on fingerprints of the content. It should be noted that process 1100 or any action thereof could be performed on, or provided by, any of the devices shown in FIGS. 3-4. For example, process 1000 may be executed by control circuitry 304 (FIG. 3) as instructed by a media guidance application implemented on user equipment 402, 404, and/or 406 (FIG. 4) in order to distribute control of media guidance application operations for a target device among multiple user devices. In addition, one or more actions of process 1100 may be incorporated into or combined with one or more actions of any other process or embodiment (e.g., process 700 (FIG. 7), process 1000 (FIG. 10)).

At 1102, control circuitry 304 periodically generates fingerprints based on media content that the user is consuming at a given time. Means of generating may be consistent with any means described above.

At 1104, control circuitry 304, for each generated fingerprint, performs the following actions. Control circuitry 304 determines a content identifier, where the content identifier corresponds to a respective media asset and stores, in a log, the content identifier and a timestamp, wherein the timestamp corresponds to a time that the fingerprint was generated. Means of determining may be consistent with any means described above.

At 1106, control circuitry 304 transmits to a server a request to identify a content source corresponding to a media asset, where the media asset is consumed by the user at a first time, and where the request comprises a fingerprint of the media asset generated at the first time. Means of transmitting may be consistent with any means described above.

At 1108, control circuitry 304 receives, from the server, a first content source identifier and a second content source identifier, where the first content source identifier and the second content source identifier correspond to a first content source and a second content source, respectively, that are both transmitting the media asset at the first time. Means of receiving may be consistent with any means described above.

At 1110, control circuitry 304 transmits, to the server, a request for a first plurality of content identifiers and corresponding timestamps and a second plurality of content identifiers and corresponding timestamps, where the first plurality of content identifiers and the second plurality of content identifiers correspond to content transmitted by the first content source and by the second content source, respectively. Means of transmitting may be consistent with any means described above.

At 1112, control circuitry 304, in response to receiving the first plurality of content identifiers and the second plurality of content identifiers, matches each content identifier from the first plurality of content identifiers with a content identifier from the second plurality of content identifiers to create a plurality of matched pairs of content identifiers, where the matching is performed based on a timestamp associated with the respective content identifier. Means of matching may be consistent with any means described above.

At 1114, control circuitry 304 iterates through each matched pair of content identifiers in reverse chronological order until a first content identifier from the first plurality of content identifiers diverges from a second content identifier from the second plurality of content identifiers, where the iterating comprises comparing each content identifier from the first plurality of content identifiers with a matched content identifier from the second plurality of content identifiers. Means of iterating may be consistent with any means described above.

At 1116, control circuitry 304 compares the first content identifier from the first plurality of content identifiers to a contemporaneous content identifier stored in the log and comparing the second content identifier from the second plurality of content identifiers to the contemporaneous content identifier stored in the log to determine whether the first content identifier from the first plurality of content identifiers or the second content identifier from the second plurality of content identifiers matches the contemporaneous content identifier from the log. Means of comparison may be consistent with any means described above.

At 1118, control circuitry 304 determines whether the first content source or the second content source is a source of content that the user is presently consuming based on whether the first content identifier from the first plurality of content identifiers or the second content identifier from the second plurality of content identifiers matches the contemporaneous content identifier from the log. Means of determining may be consistent with any means described above.

It is contemplated that the actions or descriptions of FIG. 11 may be used with any other embodiment of this disclosure. In addition, the actions and descriptions described in relation to FIG. 11 may be done in alternative orders or in parallel to further the purposes of this disclosure. For example, each of these actions may be performed in any order or in parallel or substantially simultaneously to reduce lag or increase the speed of the system or method. Furthermore, it should be noted that any of the devices or equipment discussed in relation to FIGS. 3-4 could be used to perform one or more of the actions in FIG. 11.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for determining a source of content that the user is presently consuming, the method comprising:
   periodically generating fingerprints based on media content that the user is consuming at a given time;
   for each generated fingerprint:
   determining a content identifier, wherein the content identifier corresponds to a respective media asset; and
   storing, in a log, the content identifier and a timestamp, wherein the timestamp corresponds to a time that the fingerprint was generated;
   transmitting, to a server, a request to identify a content source corresponding to a media asset, wherein the media asset is consumed by the user at a first time, and wherein the request comprises a fingerprint generated at the first time based on the media asset;
   receiving, from the server, a first content source identifier, and a second content source identifier, wherein the first content source identifier and the second content source identifier correspond to a first content source and a second content source, respectively, that are both transmitting the media asset at the first time;
   transmitting, to the server, a request for a first plurality of content identifiers and corresponding timestamps and a second plurality of content identifiers and corresponding timestamps, wherein the first plurality of content identifiers and the second plurality of content identifiers correspond to content transmitted by the first content source and by the second content source, respectively;
   in response to receiving the first plurality of content identifiers and the second plurality of content identifiers, matching each content identifier from the first plurality of content identifiers with a content identifier from the second plurality of content identifiers to create a plurality of matched pairs of content identifiers, wherein the matching is performed based on a timestamp associated with the respective content identifier;
   iterating through each matched pair of content identifiers in reverse chronological order until a first content identifier from the first plurality of content identifiers diverges from a second content identifier from the second plurality of content identifiers, wherein the iterating comprises comparing each content identifier from the first plurality of content identifiers with a matched content identifier from the second plurality of content identifiers;
   comparing the first content identifier from the first plurality of content identifiers to a contemporaneous content identifier stored in the log and comparing the second content identifier from the second plurality of content identifiers to the contemporaneous content identifier stored in the log to determine whether the first content identifier from the first plurality of content identifiers or the second content identifier from the second plurality of content identifiers matches the contemporaneous content identifier from the log; and
   determining whether the first content source or the second content source is a source of content that the user is presently consuming based on whether the first content identifier from the first plurality of content identifiers or the second content identifier from the second plurality of content identifiers matches the contemporaneous content identifier from the log.

2. The method of claim 1, wherein the fingerprints generated based on the media content that the user is consuming at the given time are generated on a first device and the log is located at a second device.

3. The method of claim 2, wherein comparing the first content identifier from the first plurality of content identifiers to the contemporaneous content identifier stored in the log and comparing the second content identifier from the second plurality of content identifiers to the contemporaneous content identifier stored in the log comprises:
   transmitting, to the second device, a request for the contemporaneous content identifier, wherein the request comprises a timestamp associated with the first content identifier; and
   receiving, from the remote server, the contemporaneous content identifier, wherein the contemporaneous content identifier corresponds to a timestamp closer in time to the timestamp of the first content identifier than to a timestamp of any other content identifier in the log.

4. The method of claim 1, wherein the request for the first plurality of content identifiers associated with the content transmitted by the first content source and the second plurality of content identifiers associated with the content transmitted by the second content source comprises a time range and an instruction to the server to transmit back content identifiers with corresponding timestamps in the time range.

5. The method of claim 1, further comprising:
   identifying the first content source as the source of content that the user is presently consuming;
   generating for display a user-selectable indication of the second content source; and
   in response to a user selection of the user-selectable indication, generating for display content from the second content source.

6. The method of claim 1, wherein matching each content identifier from the first plurality of content identifiers with the content identifier from the second plurality of content identifiers to create the plurality of matched pairs of content identifiers comprises:

indexing the first plurality of content identifiers and the second plurality of content identifiers by time based on respective timestamps; and matching each content identifier from the first plurality of content identifiers with a corresponding content identifier from the second plurality of content identifiers according to the index.

7. The method of claim 1, wherein matching each content identifier from the first plurality of content identifiers with the content identifier from the second plurality of content identifiers to create the plurality of matched pairs of content identifiers comprises:

sorting the first plurality of content identifiers in reverse chronological order based on respective timestamps corresponding to content identifiers of the first plurality of content identifiers;

sorting the second plurality of content identifiers in reverse chronological order based on respective timestamps corresponding to content identifiers of the second plurality of content identifiers; and matching each content identifier from the first plurality of content identifiers with a corresponding content identifier from the second plurality of content identifiers according to the sorting order.

8. The method of claim 1, wherein comparing the first content identifier from the first plurality of content identifiers to the contemporaneous content identifier stored in the log and comparing the second content identifier from the second plurality of content identifiers to the contemporaneous content identifier stored in the log comprises:

determining a timestamp corresponding to the first content identifier from the first plurality of content identifiers;

searching for the contemporaneous content identifier by identifying a content identifier in the log that corresponds to a timestamp closer in time to the timestamp of the first content identifier than to a timestamp of any other content identifier in the log; and comparing both the first content identifier and the second content identifier with the contemporaneous content identifier.

9. The method of claim 1, further comprising:

generating a media fingerprint based on media content being transmitted;

identifying a media asset corresponding to the media fingerprint by cross-referencing a time the fingerprint was generated and a content source corresponding to the media fingerprint with scheduling data;

performing a search for the media asset in a database that stores media asset identifiers and corresponding content identifiers;

based on the search returning no results, generating a content identifier for the media asset corresponding to the media fingerprint.

10. The method of claim 1, wherein the log of fingerprints is located on a device where the fingerprint generated based on the media content that the user is consuming at the given time is generated.

11. A system for determining a source of content that the user is presently consuming, the system comprising:

Communications circuitry; and control circuitry configured to:

periodically generate fingerprints based on media content that the user is consuming at a given time;

for each generated fingerprint:

determine a content identifier, wherein the content identifier corresponds to a respective media asset; and store, in a log, the content identifier and a timestamp, wherein the timestamp corresponds to a time that the fingerprint was generated;

transmit, to a server, a request to identify a content source corresponding to a media asset, wherein the media asset is consumed by the user at a first time, and wherein the request comprises a fingerprint generated at the first time based on the media asset;

receive, from the server, a first content source identifier, and a second content source identifier, wherein the first content source identifier and the second content source identifier correspond to a first content source and a second content source, respectively, that are both transmitting the media asset at the first time;

transmit, to the server, a request for a first plurality of content identifiers and corresponding timestamps and a second plurality of content identifiers and corresponding timestamps, wherein the first plurality of content identifiers and the second plurality of content identifiers correspond to content transmitted by the first content source and by the second content source, respectively;

in response to receiving the first plurality of content identifiers and the second plurality of content identifiers, match each content identifier from the first plurality of content identifiers with a content identifier from the second plurality of content identifiers to create a plurality of matched pairs of content identifiers, wherein the matching is performed based on a timestamp associated with the respective content identifier;

iterate through each matched pair of content identifiers in reverse chronological order until a first content identifier from the first plurality of content identifiers diverges from a second content identifier from the second plurality of content identifiers, wherein the iterating comprises comparing each content identifier from the first plurality of content identifiers with a matched content identifier from the second plurality of content identifiers;

compare the first content identifier from the first plurality of content identifiers to a contemporaneous content identifier stored in the log and comparing the second content identifier from the second plurality of content identifiers to the contemporaneous content identifier stored in the log to determine whether the first content identifier from the first plurality of content identifiers or the second content identifier from the second plurality of content identifiers matches the contemporaneous content identifier from the log; and determine whether the first content source or the second content source is a source of content that the user is presently consuming based on whether the first content identifier from the first plurality of content identifiers or the second content identifier from the second plurality of content identifiers matches the contemporaneous content identifier from the log.

12. The system of claim 11, wherein the fingerprints generated based on the media content that the user is consuming at the given time are generated on a first device and the log is located at a second device.

13. The system of claim 12, wherein the control circuitry is further configured, when comparing the first content identifier from the first plurality of content identifiers to the contemporaneous content identifier stored in the log and comparing the second content identifier from the second plurality of content identifiers to the contemporaneous content identifier stored in the log, to:

transmit, to the second device, a request for the contemporaneous content identifier, wherein the request comprises a timestamp associated with the first content identifier; and receive, from the remote server, the contemporaneous content identifier, wherein the contemporaneous content identifier corresponds to a timestamp closer in time to the timestamp of the first content identifier than to a timestamp of any other content identifier in the log.

14. The system of claim 11, wherein the request for the first plurality of content identifiers associated with the content transmitted by the first content source and the second plurality of content identifiers associated with the content transmitted by the second content source comprises a time range and an instruction to the server to transmit back content identifiers with corresponding timestamps in the time range.

15. The system of claim 11, wherein the control circuitry is further configured to:
   identify the first content source as the source of content that the user is presently consuming;
   generate for display a user-selectable indication of the second content source; and
   in response to a user selection of the user-selectable indication, generate for display content from the second content source.

16. The system of claim 11, wherein the control circuitry is further configured, when matching each content identifier from the first plurality of content identifiers with the content identifier from the second plurality of content identifiers to create the plurality of matched pairs of content identifiers, to:
   index the first plurality of content identifiers and the second plurality of content identifiers by time based on respective timestamps; and
   match each content identifier from the first plurality of content identifiers with a corresponding content identifier from the second plurality of content identifiers according to the index.

17. The system of claim 11, wherein the control circuitry is further configured, when matching each content identifier from the first plurality of content identifiers with the content identifier from the second plurality of content identifiers to create the plurality of matched pairs of content identifiers, to:
   sort the first plurality of content identifiers in reverse chronological order based on respective timestamps corresponding to content identifiers of the first plurality of content identifiers;
   sort the second plurality of content identifiers in reverse chronological order based on respective timestamps corresponding to content identifiers of the second plurality of content identifiers; and
   match each content identifier from the first plurality of content identifiers with a corresponding content identifier from the second plurality of content identifiers according to the sorting order.

18. The system of claim 11, wherein the control circuitry is further configured, when comparing the first content identifier from the first plurality of content identifiers to the contemporaneous content identifier stored in the log and comparing the second content identifier from the second plurality of content identifiers to the contemporaneous content identifier stored in the log, to:
   determine a timestamp corresponding to the first content identifier from the first plurality of content identifiers;
   search for the contemporaneous content identifier by identifying a content identifier in the log that corresponds to a timestamp closer in time to the timestamp of the first content identifier than to a timestamp of any other content identifier in the log; and
   compare both the first content identifier and the second content identifier with the contemporaneous content identifier.

19. The system of claim 11, wherein the control circuitry is further configured to:
   generate a media fingerprint based on media content being transmitted;
   identify a media asset corresponding to the media fingerprint by cross-referencing a time the fingerprint was generated and a content source corresponding to the media fingerprint with scheduling data;
   perform a search for the media asset in a database that stores media asset identifiers and corresponding content identifiers;
   based on the search returning no results, generate a content identifier for the media asset corresponding to the media fingerprint.

20. The system of claim 11, wherein the log of fingerprints is located on a device where the fingerprint generated based on the media content that the user is consuming at the given time is generated.

* * * * *